US012647682B2

(12) United States Patent　　　　(10) Patent No.:　US 12,647,682 B2

Arai et al.　　　　　　　　　　　　(45) Date of Patent:　　Jun. 2, 2026

(54) ANTI-VIBRATION DEVICE, OPTICAL DEVICE, BINOCLE, CONTROL METHOD FOR ANTI-VIBRATION DEVICE, AND PROGRAM

(71) Applicant: FUJIFILM CORPORATION, Tokyo (JP)

(72) Inventors: Masaki Arai, Saitama (JP); Junichi Yokoyama, Saitama (JP); Koichi Nagata, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 822 days.

(21) Appl. No.: 18/055,837

(22) Filed: Nov. 16, 2022

(65)　　　　　　Prior Publication Data

US 2023/0075081 A1　　Mar. 9, 2023

Related U.S. Application Data

(63) Continuation of application No. PCT/JP2021/018102, filed on May 12, 2021.

(30)　　　Foreign Application Priority Data

May 29, 2020　　(JP) ................................. 2020-094686

(51) Int. Cl.
　*H04N 23/68*　　　(2023.01)
　*G02B 23/18*　　　(2006.01)
　　　　　(Continued)

(52) U.S. Cl.
　CPC ....... *H04N 23/6812* (2023.01); *G02B 27/646* (2013.01); *G03B 5/00* (2013.01);
　　　　　(Continued)

(58) Field of Classification Search
　CPC ............. H04N 23/6812; H04N 23/683; G02B 27/646; G02B 23/18; G03B 5/00; G03B 2205/0007

See application file for complete search history.

(56)　　　　　　References Cited

U.S. PATENT DOCUMENTS

2008/0219653 A1　9/2008　Shioda
2009/0040612 A1　2/2009　Ota
　　　　　(Continued)

FOREIGN PATENT DOCUMENTS

CN　　101261421 A　　9/2008
CN　　105704364 A　　6/2016
　　　　　(Continued)

OTHER PUBLICATIONS

International Search Report issued in International Application No. PCT/JP2021/018102 on Aug. 3, 2021.
　　　　　(Continued)

*Primary Examiner* — Gevell V Selby

(74) *Attorney, Agent, or Firm* — SOLARIS Intellectual Property Group, PLLC

(57)　　　　　　ABSTRACT

Provided is an anti-vibration device which includes a shake correction unit, the anti-vibration device including a first vibration detector that is disposed in the shake correction unit, a second vibration detector that is disposed outside the shake correction unit, and a processor. The processor performs anti-vibration control based on a first output value output from the first vibration detector and a second output value output from the second vibration detector.

26 Claims, 22 Drawing Sheets

(51) Int. Cl.
G02B 27/64 (2006.01)
G03B 5/00 (2021.01)

(52) U.S. Cl.
CPC ........... *H04N 23/683* (2023.01); *G02B 23/18* (2013.01); *G03B 2205/0007* (2013.01)

(56) References Cited

U.S. PATENT DOCUMENTS

| | | | | |
|---|---|---|---|---|
| 2009/0059016 | A1 | 3/2009 | Moriya et al. | |
| 2010/0158493 | A1 | 6/2010 | Miyasako | |
| 2011/0007133 | A1* | 1/2011 | Imanishi | H04N 13/194 |
| | | | | 348/42 |
| 2012/0002060 | A1* | 1/2012 | Kusanagi | H04N 23/683 |
| | | | | 359/557 |
| 2015/0103194 | A1* | 4/2015 | Takeuchi | H04N 23/6812 |
| | | | | 348/208.6 |
| 2016/0173781 | A1 | 6/2016 | Tsuchiya | |
| 2018/0364495 | A1* | 12/2018 | Awazu | G02B 23/02 |
| 2021/0360160 | A1* | 11/2021 | Watanabe | H04N 23/6812 |
| 2022/0252897 | A1* | 8/2022 | Arai | G02B 23/18 |

FOREIGN PATENT DOCUMENTS

| | | | |
|---|---|---|---|
| JP | 2002-236302 | A | 8/2002 |
| JP | 2009-008858 | A | 1/2009 |
| JP | 2009-038515 | A | 2/2009 |
| JP | 2009-042328 | A | 2/2009 |
| JP | 2009-055568 | A | 3/2009 |
| JP | 2012-018328 | A | 1/2012 |
| JP | 2015-114615 | A | 6/2015 |
| WO | 2014/192464 | A1 | 12/2014 |

OTHER PUBLICATIONS

Written Opinion of the ISA issued in International Application No. PCT/JP2021/018102 on Aug. 3, 2021.
International Preliminary Report on Patentability issued in International Application No. PCT/JP2021/018102 on Dec. 10, 2021.
English language translation of the following: Notice dated May 30, 2025 from the SIPO in a Chinese patent application No. 202180038715.4 corresponding to the instant patent application. This office action translation is submitted now in order to supplement the understanding of the cited references which are being disclosed in the instant Information Disclosure Statement.

* cited by examiner

| | | FREQUENCY [Hz] | | |
|---|---|---|---|---|
| | | X1 | X2 | · · · |
| AMPLITUDE [dB] | Y1 | HPF: H11 [Hz]<br>LPF: L11 [Hz]<br>PARAMETER RATIO: $\alpha 11{:}\beta 11$ | HPF: H21 [Hz]<br>LPF: L21 [Hz]<br>PARAMETER RATIO: $\alpha 21{:}\beta 21$ | · · · |
| | Y2 | HPF: H12 [Hz]<br>LPF: L12 [Hz]<br>PARAMETER RATIO: $\alpha 12{:}\beta 12$ | HPF: H22 [Hz]<br>LPF: L22 [Hz]<br>PARAMETER RATIO: $\alpha 22{:}\beta 22$ | · · · |
| | ⋮ | ⋮ | ⋮ | ⋮ |

ANTI-VIBRATION DEVICE, OPTICAL DEVICE, BINOCLE, CONTROL METHOD FOR ANTI-VIBRATION DEVICE, AND PROGRAM

CROSS-REFERENCE TO RELATED APPLICATIONS

This application is a continuation application of International Application No. PCT/JP2021/018102, filed on May 12, 2021, the disclosure of which is incorporated herein by reference in its entirety. Further, this application claims priority from Japanese Patent Application No. 2020-094686, filed on May 29, 2020, the disclosure of which is incorporated herein by reference in its entirety.

BACKGROUND

1. Technical Field

The present disclosed technology relates to an anti-vibration device, an optical device, a binocle, a control method for an anti-vibration device, and a program.

2. Related Art

Disclosed in JP2009-55568A is an image shake correction device for a camera including an image shake correction unit that performs image shake correction to cancel out an image shake caused by vibration applied to an imaging optical system based on a sensor signal output from a vibration detection sensor for detection of an image shake. The image shake correction device for a camera includes a vibration signal acquisition unit that acquires a vibration signal from an external device, a noise removing unit that removes a noise of the vibration signal acquired by the vibration signal acquisition unit, and a setting unit that sets the frequency of a signal component that is to be removed as the noise by the noise removing unit based on the vibration signal acquired by the vibration signal acquisition unit in a case where there is no vibration, and the image shake correction unit performs the image shake correction based on the vibration signal acquired by the vibration signal acquisition unit after the setting unit finishes the setting of the frequency in a case where the image shake correction is to be performed based on the vibration signal acquired by the vibration signal acquisition unit instead of the sensor signal of the vibration detection sensor.

Disclosed in JP2009-38515A is an anti-vibration device for a camera device in which a revolving operation of changing an imaging direction via rotational movement around a predetermined axis is possible, the anti-vibration device including a first vibration detection unit that is provided on an imaging direction side of the camera device with respect to the center of the rotational movement, a second vibration detection unit that is provided on a side opposite the imaging direction of the camera device with respect to the center of the rotational movement, a vibration correction unit that performs vibration correction of correcting an imaging shake caused by vibration, a determination unit that determines whether or not the revolving operation is being performed by using vibration information detected by the first vibration detection unit and vibration information detected by the second vibration detection unit, and a control unit that performs control such that the vibration correction unit is caused to perform the vibration correction by using the vibration information detected by the first vibration detection unit or the second vibration detection unit in a case where the determination unit determines that the revolving operation is not being performed and the vibration correction unit is not caused to perform the vibration correction in a case where the determination unit determines that the revolving operation is being performed.

SUMMARY

An embodiment of the present disclosed technology provides an anti-vibration device, an optical device, a binocle, a control method for an anti-vibration device, and a program with which it is possible to realize anti-vibration matching the state of use of an anti-vibration device in comparison with a case where a second vibration detector disposed outside a shake correction unit is not provided.

According to a first aspect of the present disclosed technology, there is provided an anti-vibration device which includes a shake correction unit, the anti-vibration device including a first vibration detector that is disposed in the shake correction unit, a second vibration detector that is disposed outside the shake correction unit, and a processor. The processor performs anti-vibration control based on a first output value output from the first vibration detector and a second output value output from the second vibration detector.

According to a second aspect of the present disclosed technology, in the anti-vibration device related to the first aspect, the anti-vibration device may be an integrated device.

According to a third aspect of the present disclosed technology, in the anti-vibration device related to the first aspect or the second aspect, a vibration detection axis of each of the first vibration detector and the second vibration detector may be parallel to a rotary shaft of the shake correction unit.

According to a fourth aspect of the present disclosed technology, in the anti-vibration device related to the third aspect, the shake correction unit may include a plurality of the rotary shafts, and the vibration detection axes may be parallel to the rotary shafts with respect to axial directions along the vibration detection axes of the first vibration detector and the second vibration detector, respectively.

According to a fifth aspect of the present disclosed technology, in the anti-vibration device related to any one of the first to fourth aspects, the second vibration detector may have a sensitivity lower than a sensitivity of the first vibration detector.

According to a sixth aspect of the present disclosed technology, in the anti-vibration device related to any one of the first to fourth aspects, the second vibration detector may have a sensitivity equivalent to a sensitivity of the first vibration detector.

According to a seventh aspect of the present disclosed technology, in the anti-vibration device related to any one of the first to sixth aspects, a frequency band detectable by the second vibration detector may be wider than a frequency band detectable by the first vibration detector.

According to an eighth aspect of the present disclosed technology, in the anti-vibration device related to any one of the first to sixth aspects, a frequency band detectable by the second vibration detector may be equivalent to a frequency band detectable by the first vibration detector.

According to a ninth aspect of the present disclosed technology, in the anti-vibration device related to any one of the first to eighth aspects, the processor may perform control such that the first output value is made close to a predetermined value in the anti-vibration control.

According to a tenth aspect of the present disclosed technology, in the anti-vibration device related to any one of the first to ninth aspects, the processor may detect a state of use of the anti-vibration device based on the second output value and the processor may perform the anti-vibration control based on a result of the detection.

According to an eleventh aspect of the present disclosed technology, in the anti-vibration device related to the tenth aspects, the state of use may include a state resulting from a use environment of the anti-vibration device.

According to a twelfth aspect of the present disclosed technology, in the anti-vibration device related to the tenth aspect, the state of use may be at least one of a start or an end of a revolving operation of the anti-vibration device.

According to a thirteenth aspect of the present disclosed technology, in the anti-vibration device related to the twelfth aspect, the revolving operation may be at least one of a panning operation or a tilting operation.

According to a fourteenth aspect of the present disclosed technology, in the anti-vibration device related to the twelfth aspect or the thirteenth aspect, a detectable frequency band of the first vibration detector may be changeable, the processor may set the detectable frequency band to a wide frequency band in a case where the shake correction unit performs an anti-vibration operation, and the processor may change the detectable frequency band from the wide frequency band to a narrow frequency band in a case where the start of the revolving operation is detected.

According to a fifteenth aspect of the present disclosed technology, in the anti-vibration device related to the fourteenth aspect, the processor may change the detectable frequency band from the narrow frequency band to the wide frequency band in a case where the end of the revolving operation is detected.

According to a sixteenth aspect of the present disclosed technology, in the anti-vibration device related to any one of the twelfth to fourteenth aspects, the processor may change a lower limit of a detectable frequency band of the first vibration detector to a high-frequency side in a case where the end of the revolving operation is detected.

According to a seventeenth aspect of the present disclosed technology, in the anti-vibration device related to any one of the fourteenth to sixteenth aspects, the processor may measure a frequency of vibration applied to the anti-vibration device based on the second output value, and the processor may widen the detectable frequency band toward at least one of a high-frequency side or a low-frequency side in accordance with the measured frequency.

According to an eighteenth aspect of the present disclosed technology, in the anti-vibration device related to any one of the first to seventeenth aspects, the processor may store, in a memory, at least one of an amplitude or a frequency of vibration that the second output value includes, and the processor may determine control contents of the anti-vibration control in a case of activation of the anti-vibration device based on at least one of the amplitude or the frequency stored in the memory.

According to a nineteenth aspect of the present disclosed technology, in the anti-vibration device related to any one of the first to eighteenth aspects, the processor may predict displacement of the shake correction unit from a reference position by integrating the second output value, and the processor may perform control such that the shake correction unit is fixed at the reference position in a case where a predictive value of the displacement exceeds a preset range.

According to a twentieth aspect of the present disclosed technology, the anti-vibration device related to any one of the first to nineteenth aspects may include a housing that accommodates the shake correction unit and the second vibration detector may be disposed in the housing.

According to a twenty-first aspect of the present disclosed technology, in the anti-vibration device according to the twentieth aspect, the anti-vibration device may be a device integrated with the housing.

According to a twenty-second aspect of the present disclosed technology, there is provided an optical device including the anti-vibration device related to any one of the first to twenty-first aspects and one or more observation optical systems.

According to a twenty-third aspect of the present disclosed technology, there is provided a binocle including the optical device related to the twenty-second aspect that includes two observation optical systems, in which the first vibration detector is disposed at a center of a space between the two observation optical systems.

According to a twenty-fourth aspect of the present disclosed technology, in the binocle according to the twenty-third aspect, the second vibration detector may be attached to an object that holds the shake correction unit.

According to a twenty-fifth aspect of the present disclosed technology, in the binocle according to the twenty-fourth aspect, the object may be a frame that holds the shake correction unit or a housing of the binocle.

According to a twenty-sixth aspect of the present disclosed technology, there is provided a control method for an anti-vibration device including a shake correction unit, a first vibration detector disposed in the shake correction unit, and a second vibration detector disposed outside the shake correction unit, the control method including performing anti-vibration control based on a first output value output from the first vibration detector and a second output value output from the second vibration detector.

According to a twenty-seventh aspect of the present disclosed technology, there is provided a program that causes a computer applied to an anti-vibration device including a shake correction unit, a first vibration detector disposed in the shake correction unit, and a second vibration detector disposed outside the shake correction unit to execute a process including performing anti-vibration control based on a first output value output from the first vibration detector and a second output value output from the second vibration detector.

BRIEF DESCRIPTION OF THE DRAWINGS

Exemplary embodiments of the technology of the disclosure will be described in detail based on the following figures, wherein:

FIG. 20 is a reference diagram showing an example of a matrix table for determining a detectable frequency band of a first gyro sensor and a ratio between first parameter and a second parameter in accordance with the amplitude and the frequency of vibration in a binocle according to a fifth embodiment;

DETAILED DESCRIPTION

Hereinafter, an example of an embodiment of a distance measurement imaging apparatus according to the present disclosed technology will be described with reference to the accompanying drawings.

First, terms used in the following description will be described.

"CPU" is the abbreviation of "Central Processing Unit". "RAM" is the abbreviation for "Random Access Memory". "EEPROM" is the abbreviation of "Electrically Erasable Programmable Read-Only Memory". "SSD" is the abbreviation of "Solid State Drive". "ASIC" is the abbreviation of "Application Specific Integrated Circuit". "PLD" is the abbreviation of "Programmable Logic Device". "FPGA" is the abbreviation of "Field-Programmable Gate Array". "SoC" is the abbreviation of "System-on-a-Chip". "USB" is the abbreviation of "Universal Serial Bus". "HDD" is the abbreviation of "Hard Disk Drive". "HPF" is the abbreviation of "High-Pass Filter". "LPF" is the abbreviation of "Low-Pass Filter". "IC" is the abbreviation of "Integrated Circuit". "DRAM" is the abbreviation of "Dynamic Random Access Memory". "SRAM" is the abbreviation of "Static Random Access Memory".

In the description of the present specification, the meaning of "being parallel with each other" includes not only "being completely parallel with each other" but also "being parallel with each other with an error generally acceptable in a technical field to which the present disclosed technology belongs to an extent that is not inconsistent with the gist of the present disclosed technology". In addition, in the description of the present specification, the meaning of "coinciding with each other" includes not only "completely coinciding with each other" but also "coinciding with each other with an error generally acceptable in a technical field to which the present disclosed technology belongs to an extent that is not inconsistent with the gist of the present disclosed technology". In addition, in the description of the present specification, the meaning of "being equivalent with each other" includes not only "being completely equivalent with each other" but also "being equivalent with each other with an error generally acceptable in a technical field to which the present disclosed technology belongs to an extent that is not inconsistent with the gist of the present disclosed technology". In addition, in the description of the present specification, the meaning of "being constant" includes not only "being completely constant" but also "being constant with an error generally acceptable in a technical field to which the present disclosed technology belongs to an extent that is not inconsistent with the gist of the present disclosed technology".

First Embodiment

Figure 1:
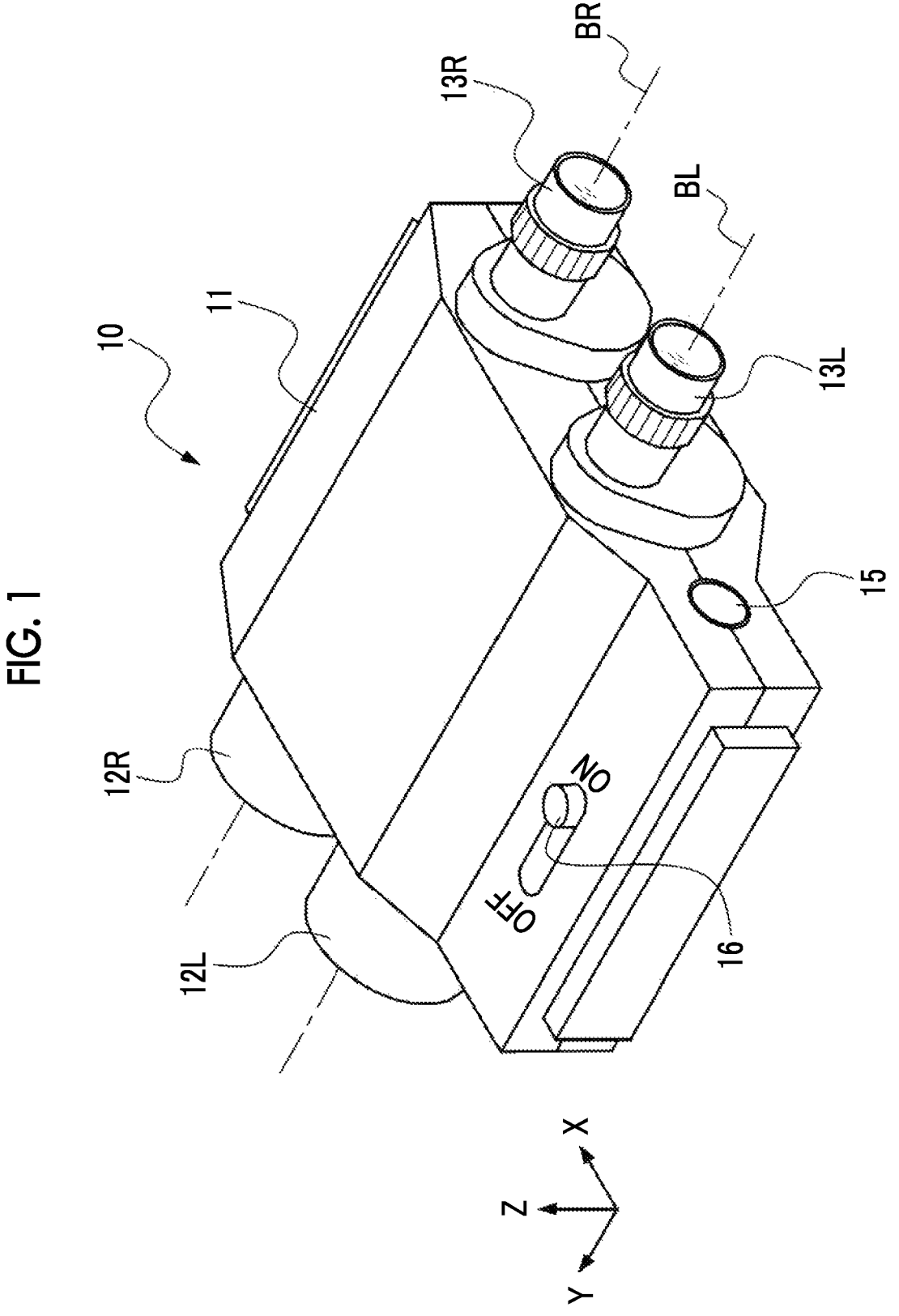
FIG. 1 is a schematic perspective view showing an example of the appearance of a binocle.

For example, as shown in FIG. 1, a binocle 10 includes a housing 11 having a substantially rectangular shape, a pair of objective lens units 12R and 12L provided in front of the housing 11, and a pair of ocular lens units 13R and 13L provided behind the housing 11. In the following description, a width direction of the binocle 10 will be referred to as a direction X, a front-rear direction of the binocle 10 will be referred to as a direction Y, and a vertical direction of the binocle 10 will be referred to as a direction Z. In addition, a direction toward an observation target of the binocle 10, that is, a direction in which the objective lens units 12R and 12L are disposed will be referred to as a forward direction. In addition, a direction in which a user of the binocle 10 (hereinafter, simply referred to as "user") is positioned, that is, a direction in which the ocular lens units 13R and 13L are disposed will be referred to as a rearward direction. Furthermore, an optical system for generating an image to be observed by the right eye of the user will be referred to as a right eye optical system and an optical system for generating an image to be observed by the left eye of the user will be referred to as a left eye optical system. Note that the binocle 10 is an example of a "binocle" and an "optical device" according to the present disclosed technology. The right eye optical system and the left eye optical system are examples of "one or more observation optical systems" and "two observation optical systems" according to the present disclosed technology. In the following description, for the sake of convenience, the right eye optical system and the left eye optical system will be simply referred to as "optical systems" in a case where the right eye optical system and the left eye optical system do not need to be distinguished from each other.

The objective lens unit 12R and the ocular lens unit 13R are arranged along the direction Y and form a part of the right eye optical system. The objective lens unit 12L and the ocular lens unit 13L are arranged along the direction Y and form a part of the left eye optical system.

A rear surface of the housing 11 is provided with a push button type power switch 15. In a case where the power switch 15 is pressed, the binocle 10 is switched on and off.

An upper surface of the housing 11 is provided with a slide type anti-vibration switch 16. In a case where the anti-vibration switch 16 is slid rearward, an anti-vibration operation (hereinafter, may be simply referred to as "anti-vibration operation") performed by a shake correction unit 30 (refer to FIGS. 2 and 3), which will be described later, is started. In a case where the anti-vibration switch 16 is slid forward, the anti-vibration operation is stopped.

Figure 2:
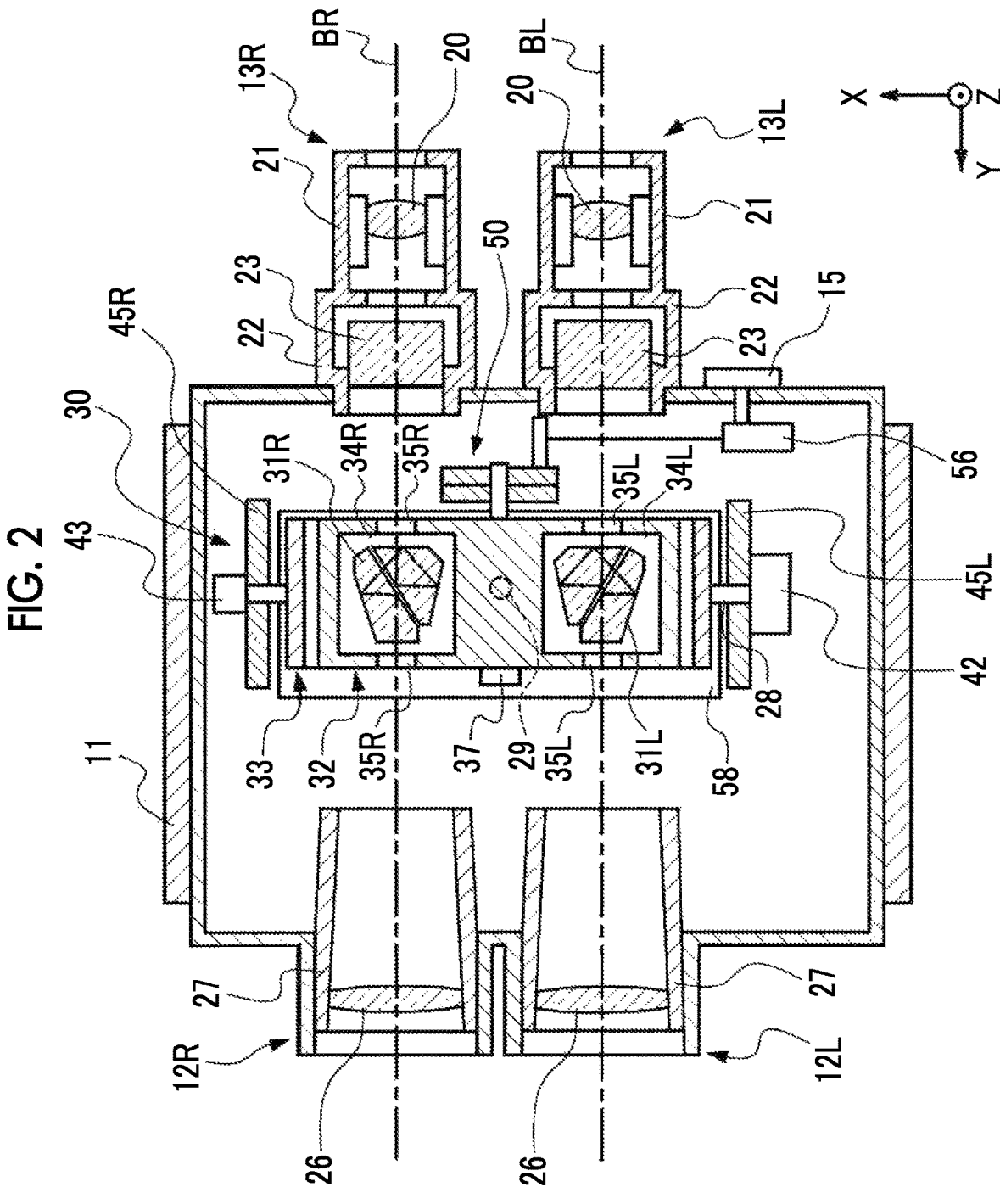
FIG. 2 is a cross-sectional view showing an example of the internal configuration of the binocle.
Figure 3:
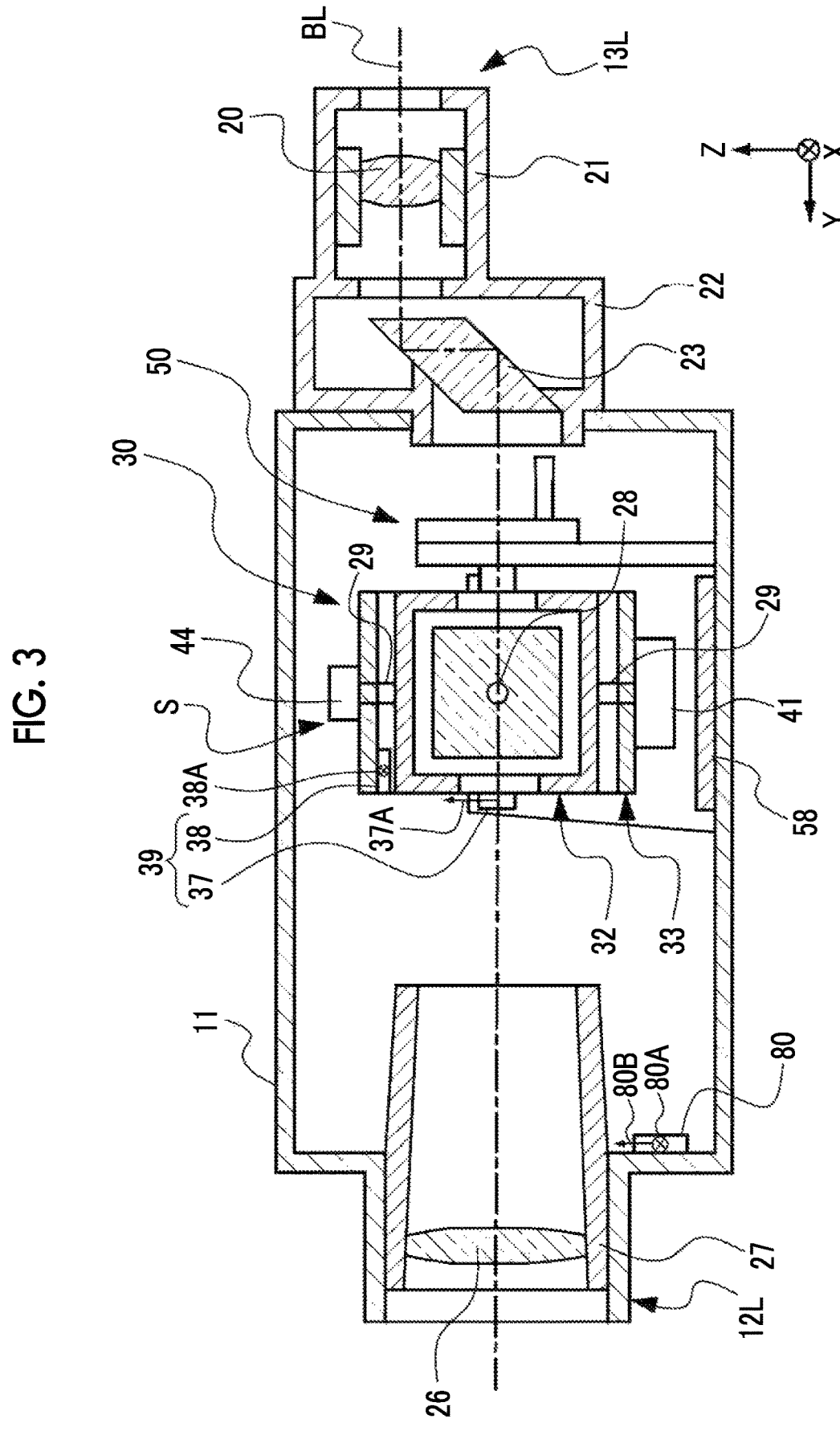
FIG. 3 is a vertical cross-sectional view showing an example of the internal configuration of the binocle.

For example, as shown in FIGS. 2 and 3, the housing 11 accommodates the shake correction unit 30. The shake correction unit 30 includes a mechanism that prevents generation of an image shake caused by vibration (hereinafter, may be simply referred to as "vibration") applied to the binocle 10. Examples of the vibration include vibration caused by a camera shake of a user holding the binocle 10, or vibration caused by shaking of a vehicle (for example, a vehicle, a ship, or the like). Here, the "image" refers to, for example, an optical image that is formed in a case where observation target light indicating an observation target is incident on the optical systems. The shake correction unit 30 is disposed between the objective lens units 12R and 12L and the ocular lens units 13R and 13L in the direction Y. Note that the shake correction unit 30 is an example of a "shake correction unit" according to the present disclosed technology, and the housing 11 is an example of a "housing" according to the present disclosed technology.

Each of the ocular lens units 13R and 13L includes an ocular lens 20, an ocular barrel 21 holding the ocular lens 20, and a prism holder 22 connected to the ocular barrel 21. The prism holder 22 accommodates a bending prism 23. The bending prism 23 bends an incidence ray so that the optical axis thereof is shifted. In an example shown in FIG. 3, a left eye optical axis BL is shifted in a Z-axis direction by the bending prism 23.

Each of the objective lens units 12R and 12L includes an objective lens 26 and an objective barrel 27 holding the objective lens 26. In FIGS. 2 and 3, for the sake of convenience of illustration, each of the ocular lenses 20 and the objective lenses 26 is drawn as one lens. However, each of the ocular lenses 20 and the objective lenses 26 is a lens group including a plurality of lenses.

The shake correction unit 30 accommodates correction optical elements 31R and 31L. The correction optical elements 31R and 31L are, for example, roof prism type erecting prism s and restore inverted images formed by the objective lenses 26 and the ocular lenses 20 to erecting images. Note that as the correction optical elements 31R and 31L, Porro prism type erecting prisms may be used and erecting lenses may also be used instead of the erecting prisms.

The right eye optical system includes the objective lens 26, the correction optical element 31R, and the bending prism 23. Along a right eye optical axis BR, the objective lens 26, the correction optical element 31R, and the bending prism 23 are disposed in the order of the objective lens 26, the correction optical element 31R, and the bending prism 23 from an observation target side. The left eye optical system includes the objective lens 26, the correction optical element 31L, and the bending prism 23. Along a left eye optical axis BL, the objective lens 26, the correction optical element 31L, and the bending prism 23 are disposed in the order of the objective lens 26, the correction optical element 31L, and the bending prism 23 from the observation target side. The observation target light is incident on the ocular lenses 20 via the right eye optical system and the left eye optical system. Accordingly, the user can observe the observation target as if the enlarged observation target is in front of the eyes of the user by viewing the observation target through the right eye optical system and the left eye optical system.

Figure 4:
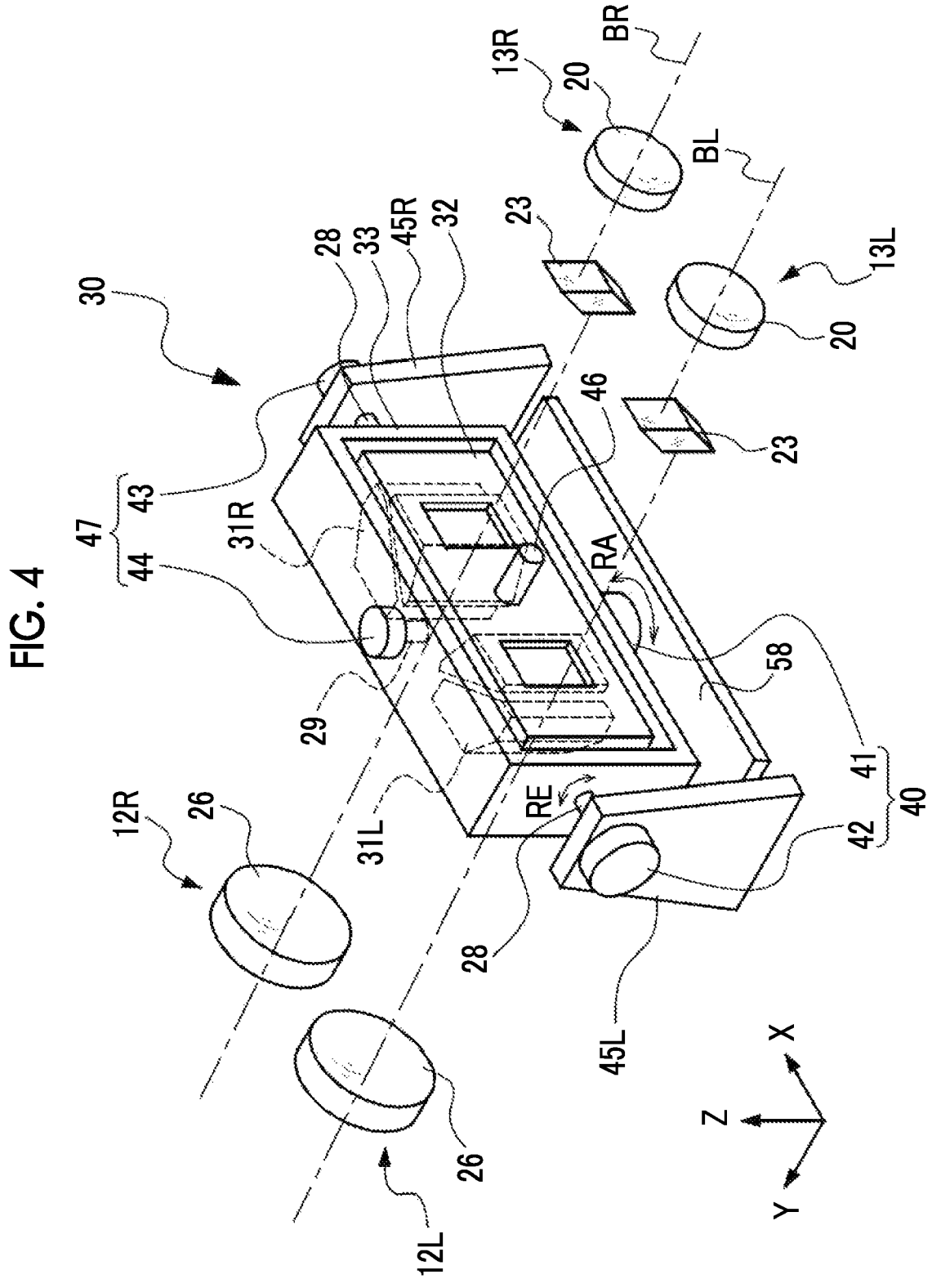
FIG. 4 is a perspective view showing an example of the configurations of an optical system and a shake correction unit included in the binocle.

For example, as shown in FIG. 4, the shake correction unit 30 includes, for example, a gimbal structure. The shake correction unit 30 includes a first holder 32 and a second holder 33. The first holder 32 holds the correction optical elements 31R and 31L. The second holder 33 holds the first holder 32. The first holder 32 has a rectangular parallelepiped shape and is disposed with a longitudinal direction thereof being parallel with the direction X.

The shake correction unit 30 includes a plurality of rotary shafts. The rotary shafts that the shake correction unit 30 includes are rotary shafts 28 and 29. The first holder 32 is supported by the rotary shaft 29 and is rotatable around the rotary shaft 29 in a direction along an arrow RA around a Z-axis, the rotary shaft 29 being provided at the second holder 33 along the direction Z. The second holder 33 has a rectangular parallelepiped shape larger than that of the first holder 32, and is disposed with a longitudinal direction thereof being parallel with the direction X. In a case where the second holder 33 is in a posture as shown in FIG. 4, the second holder 33 has a frame shape including a surface parallel with the right eye optical axis BR and the left eye optical axis BL and the first holder 32 is rotatably accommodated inside the second holder 33. The second holder 33 is supported by the rotary shaft 28 and is rotatable in a direction along an arrow RE around an X-axis, the rotary shaft 28 being provided along the direction X. The rotary shaft 28 is supported by a pair of bearing portions 45R and 45L provided in the housing 11. Note that the rotary shafts 28 and 29 are examples of "rotary shafts" according to the present disclosed technology.

For example, as shown in FIG. 2, the first holder 32 includes an element accommodation portion 34R on the right eye optical axis BR and an element accommodation portion 34L on the left eye optical axis BL. The element accommodation portion 34R accommodates the correction optical element 31R and the element accommodation portion 34L accommodates the correction optical element 31L. Openings 35R are provided in a front surface and a rear surface of the first holder 32. Through the openings 35R, the correction optical element 31R in the element accommodation portion 34R is exposed on the right eye optical axis BR. In addition, openings 35L are provided in the front surface and the rear surface of the first holder 32. Through the openings 35L, the correction optical element 31L in the element accommodation portion 34L is exposed on the left eye optical axis BL.

In a case where vibration is applied to the housing 11 because of the influence of a camera shake or the like of a user holding the binocle 10, the vibration causes a shake in an image observed through the binocle 10. However, an inertial force corresponding to the vibration applied to the housing 11 acts on the shake correction unit 30 including the gimbal structure and thus the vibration is less likely to be transmitted to the correction optical elements 31R and 31L in comparison with a case where an anti-vibration structure such as the gimbal structure is not provided. Accordingly, relative displacement occurs between the correction optical elements 31R and 31L, the objective lens units 12R and 12L, and the ocular lens units 13R and 13L and thus an image shake to be observed is reduced in comparison with a case where an anti-vibration structure such as the gimbal structure is not provided.

For example, as shown in FIG. 3, the shake correction unit 30 includes a first gyro sensor 39 that detects an angular velocity based on rotation of the shake correction unit 30. In addition, as shown in FIG. 4, for example, the shake correction unit 30 includes a shake correction motor 40 that is driven based on the result of detection performed by the first gyro sensor 39.

For example, as shown in FIG. 3, the first gyro sensor 39 is disposed in the shake correction unit 30. More specifically, the first gyro sensor 39 is disposed at the center of a space between the right eye optical system and the left eye optical system. The first gyro sensor 39 detects an angular velocity based on rotation of the shake correction unit 30 and outputs the angular velocity as a first angular velocity signal (refer to FIGS. 9 and 10). The first gyro sensor 39 is an example of a "first vibration detector" according to the present disclosed technology.

The first gyro sensor 39 includes an X-axis gyro sensor 38 and a Z-axis gyro sensor 37 (refer to FIG. 3). The X-axis gyro sensor 38 is attached to an upper surface of an inner wall of the second holder 33 and the X-axis gyro sensor 38 detects the angular velocity of the second holder 33 rotated around a vibration detection axis 38A parallel to the X-axis, that is, the angular velocity of the second holder 33 around the X-axis. The Z-axis gyro sensor 37 is attached to a front surface of the first holder 32. The Z-axis gyro sensor 37 detects the angular velocity of the first holder 32 rotated around a vibration detection axis 37A parallel to the Z-axis, that is, the angular velocity of the first holder 32 around the Z-axis. The vibration detection axes 38A and 37A are examples of the "vibration detection axes" according to the present disclosed technology, and the X-axis direction and the Z-axis direction are examples of the "axial directions" according to the present disclosed technology.

As each of the X-axis gyro sensor 38 and the Z-axis gyro sensor 37, for example, a piezoelectric vibration gyro sensor that includes a columnar vibrator having a circular columnar shape and a plurality of piezoelectric ceramics and uses a Coriolis force is used. Note that instead of the piezoelectric vibration gyro sensor in which the circular columnar vibrator is used, a piezoelectric vibration gyro sensor in which a triangular columnar vibrator, a quadrangular columnar vibrator, or a tuning fork-shaped vibrator is used may be used.

For example, as shown in FIG. 4, the shake correction motor 40 includes an X-axis motor 42 and a Z-axis motor 41. The X-axis motor 42 is attached to the bearing portion 45L. The X-axis motor 42 is connected to one end of the rotary shaft 28 and rotates the second holder 33 around the X-axis via the rotary shaft 28. The Z-axis motor 41 is attached to the second holder 33. The Z-axis motor 41 is connected to one end of the rotary shaft 29 and rotates the first holder 32 around the Z-axis via the rotary shaft 29.

The shake correction motor 40 generates a driving force based on the result of detection performed by the first gyro sensor 39 and transmits the generated driving force to the rotary shafts 28 and 29. In a case where the driving force generated by the shake correction motor 40 is transmitted to the rotary shafts 28 and 29, the first holder 32 and the second holder 33 oscillate around the Z-axis and the X-axis, respectively. Here, in a case where anti-vibration control, which will be described later, is performed, the shake correction unit 30 rotates such that the first angular velocity signal becomes close to a predetermined value. Therefore, an image shake is corrected with higher accuracy in comparison with a case where only the gimbal structure is provided. Note that, an example of the predetermined value is zero. In a case where the shake correction unit 30 is rotated such that the first angular velocity signal becomes close to zero, vibration applied to the housing 11 is canceled out. Here, the meaning of "to cancel out" includes not only "to cancel out vibration so that an image shake is completely eliminated" but also "to cancel out vibration to an extent that an image shake is reduced". Although an example of the predetermined value is zero here, the present disclosed technology is not limited thereto, and a value other than zero may also be used. The predetermined value can be changed depending on settings.

For example, as shown in FIG. 3, a second gyro sensor 80 is disposed in the housing 11. The second gyro sensor 80 is disposed outside the shake correction unit 30. The second gyro sensor 80 is disposed at a position where the second gyro sensor 80 does not interfere with both of the right eye optical axis BR and the left eye optical axis BL. In an example shown in FIG. 3, the second gyro sensor 80 is attached to a front side of the housing 11 while being disposed below the objective barrel 27. The second gyro sensor 80 detects an angular velocity based on vibration applied to the housing 11 and outputs the angular velocity as a second angular velocity signal (refer to FIGS. 9 and 10). The second gyro sensor 80 is an example of a "second vibration detector" according to the present disclosed technology.

The second gyro sensor 80 includes an X-axis gyro sensor (not shown) and a Z-axis gyro sensor (not shown). The X-axis gyro sensor detects an angular velocity around a vibration detection axis 80A parallel to the X-axis applied to the housing 11. The Z-axis gyro sensor detects an angular velocity around a vibration detection axis 80B parallel to the Z-axis applied to the housing 11. Note that the vibration detection axes 80A and 80B are examples of "vibration detection axes" according to the present disclosed technology.

In the binocle 10, the vibration detection axes of the first gyro sensor 39 and the second gyro sensor 80 are parallel to the rotary shafts of the shake correction unit 30, respectively. That is, in the binocle 10, the vibration detection axes are parallel to the rotary shafts of the shake correction unit 30 with respect to axial directions along the vibration detection axes of the first gyro sensor 39 and the second gyro sensor 80, respectively. More specifically, the X-axis gyro sensor 38 and the second gyro sensor 80 are disposed such that the vibration detection axis 38A and the vibration detection axis 80A are parallel to the rotary shaft 28. Also, the Z-axis gyro sensor 37 and the second gyro sensor 80 are disposed such that the vibration detection axis 37A and the vibration detection axis 80B are parallel to the rotary shaft 29.

In the first embodiment, the first gyro sensor 39 and the second gyro sensor 80 have sensitivities equivalent to each other. In addition, a frequency band detectable by the second gyro sensor 80 is equivalent to a frequency band detectable by the first gyro sensor 39.

For example, as shown in FIG. 4, the shake correction unit 30 includes a position sensor 47. The position sensor 47 detects angles that change in the case of relative rotation of the housing 11 and the shake correction unit 30 and outputs the angles as a current position signal (refer to FIGS. 9 and 10).

The position sensor 47 includes an X-axis position sensor 43 and a Z-axis position sensor 44. The X-axis position sensor 43 is attached to the bearing portion 45R. The X-axis position sensor 43 is connected to one end of the rotary shaft 28 and detects the angle of the second holder 33 rotated around the X-axis, that is, the angle of the second holder 33 around the X-axis. The Z-axis position sensor 44 is attached to the second holder 33. The Z-axis position sensor 44 is connected to one end of the rotary shaft 29 and detects the angle of the first holder 32 rotated around the Z-axis, that is, the angle of the first holder 32 around the Z-axis. Here, position sensors are used as the X-axis position sensor 43 and the Z-axis position sensor 44. Note that, as an angular position information detection unit, a resolver, a synchro, a rotary encoder, or the like may be used instead of the position sensors.

Figure 5:
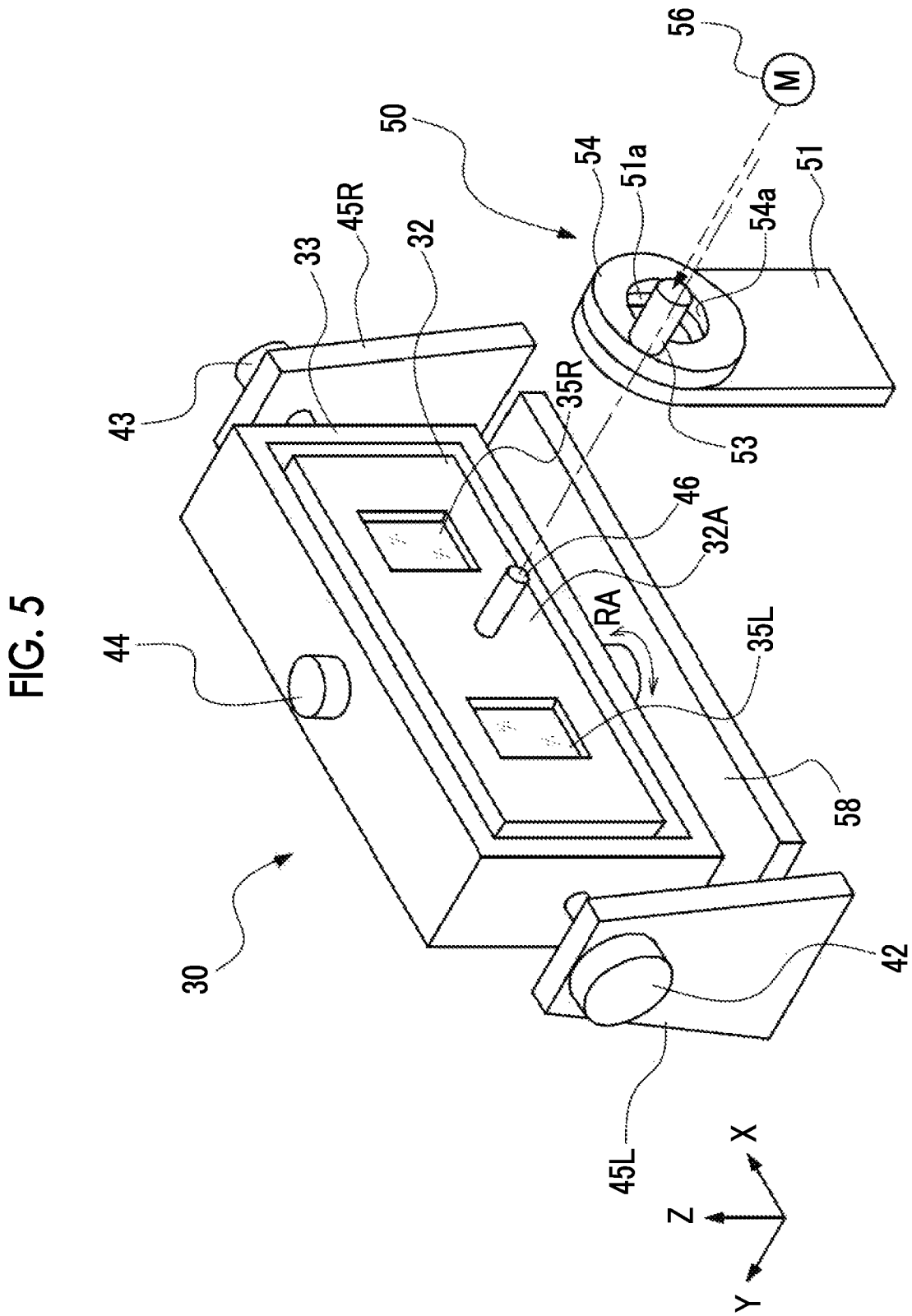
FIG. 5 is a perspective view showing an example of the configurations of the shake correction unit and a fixation mechanism included in the binocle.

For example, as shown in FIG. 5, the shake correction unit 30 includes a fixation mechanism 50 on a rear surface side of the housing 11. The shake correction unit 30 has a fixation rod 46. The fixation rod 46 is a protruding portion protruding from the shake correction unit 30. Specifically, the fixation rod 46 protrudes rearward, from a central portion of a rear surface 32A of the first holder 32, in a circular columnar shape along an optical axis. The fixation mechanism 50 comes into contact with the fixation rod 46 provided on the shake correction unit 30 so that the position of the shake correction unit 30 is fixed.

Figure 6:
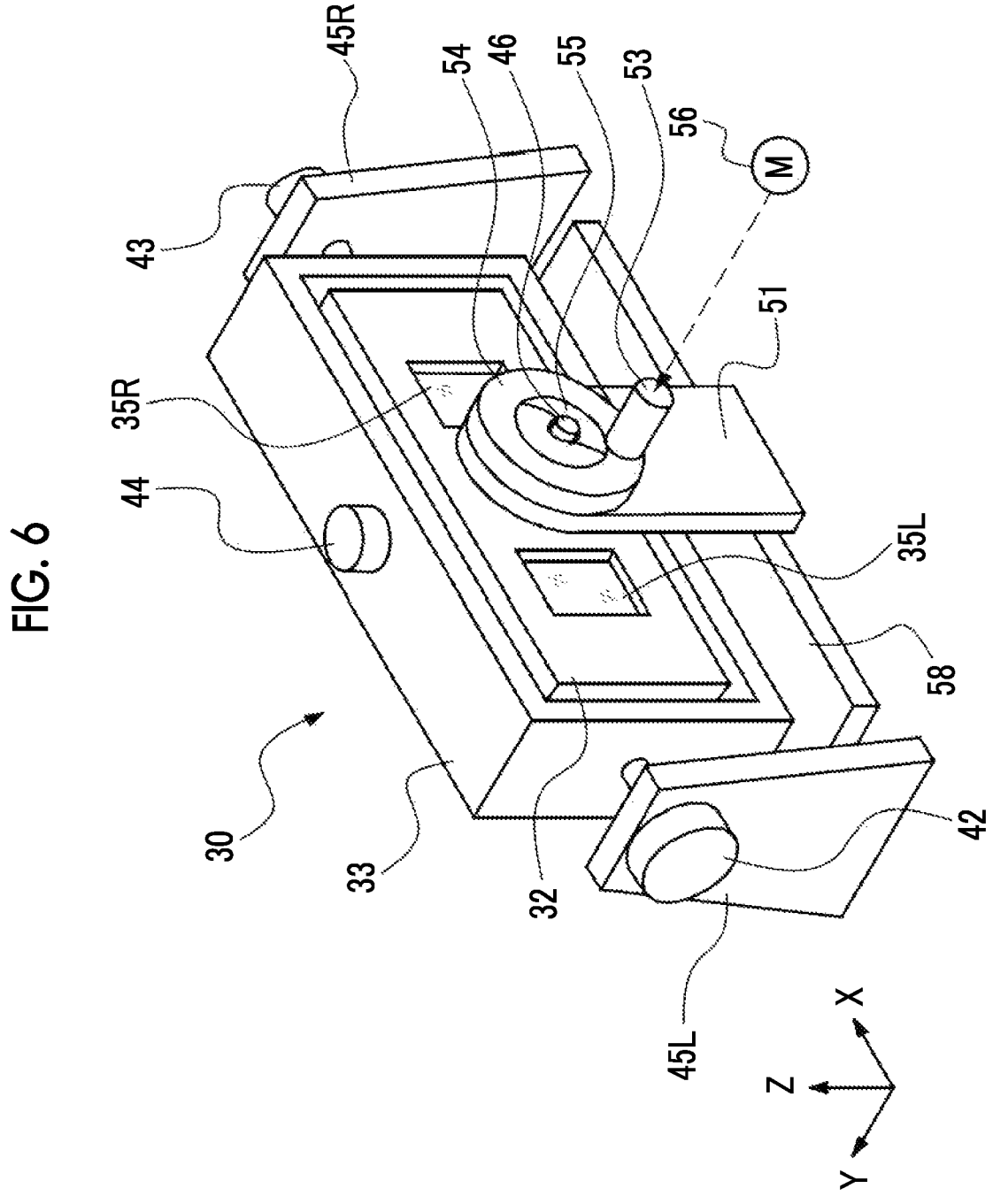
FIG. 6 is a perspective view showing an example of the way in which the shake correction unit is fixed by the fixation mechanism.

The fixation mechanism 50 includes a substrate portion 51 fixed to the housing 11, a rotary ring 54 disposed on a rear surface side of the substrate portion 51, and a displacement member 55 (refer to FIG. 6) incorporated between the substrate portion 51 and the rotary ring 54. The substrate portion 51 and the rotary ring 54 are respectively provided with circular openings 51a and 54a into which the fixation rod 46 is inserted. The rotary ring 54 is rotatable around the opening 54a with respect to the substrate portion 51. A pin 53 is erected on the rotary ring 54 and the pin 53 is connected to a displacement member opening and closing motor 56 provided in the housing 11.

The displacement member 55 is displaced between a fixation position where the position of the shake correction unit 30 is fixed and a release position where fixation is released. The displacement member 55 is supported by a rotary shaft (not shown) provided for the substrate portion

51 and the rotary ring 54. The fixation position is a position where the displacement member 55 protrudes into the openings 51a and 54a because of rotation of the rotary ring 54. The release position is a position where the displacement member 55 is withdrawn from the openings 51a and 54a because of rotation of the rotary ring 54.

Specifically, in a case where the anti-vibration switch 16 is slid forward and the anti-vibration switch 16 is turned off, the displacement member opening and closing motor 56 is driven and the pin 53 is rotated downward. In a case where the pin 53 is rotated downward, the rotary ring 54 is rotated and the displacement member 55 is displaced to the fixation position where the displacement member 55 protrudes into the openings 51a and 54a. Accordingly, the fixation mechanism 50 enters a fixation state where the position of the shake correction unit 30 is fixed.

On the other hand, in a case where the anti-vibration switch 16 is slid rearward and the anti-vibration switch 16 is turned on, the displacement member opening and closing motor 56 is driven in a backward direction and the pin 53 is rotated upward. In a case where the pin 53 is rotated upward, the rotary ring 54 is rotated and the displacement member 55 is displaced to the release position where the displacement member 55 is withdrawn from the openings 51a and 54a. Accordingly, the fixation mechanism 50 enters a release state where the position of the shake correction unit 30 is not fixed.

Figure 7:
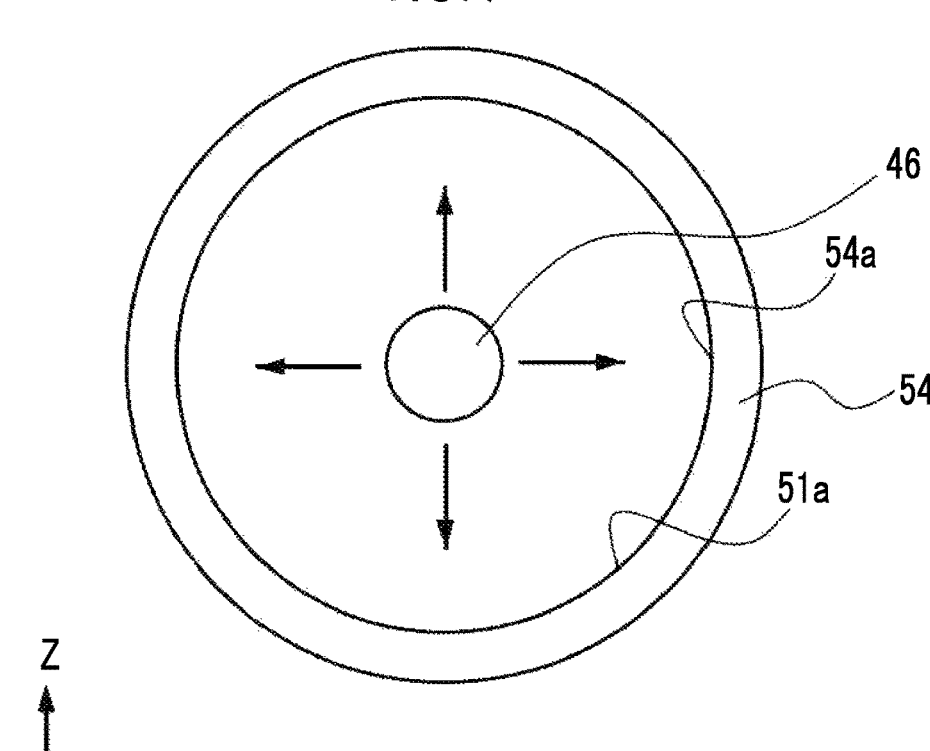
FIG. 7 is a conceptual diagram showing an example of the way in which the fixation mechanism releases a fixation rod of the shake correction unit.
Figure 8:
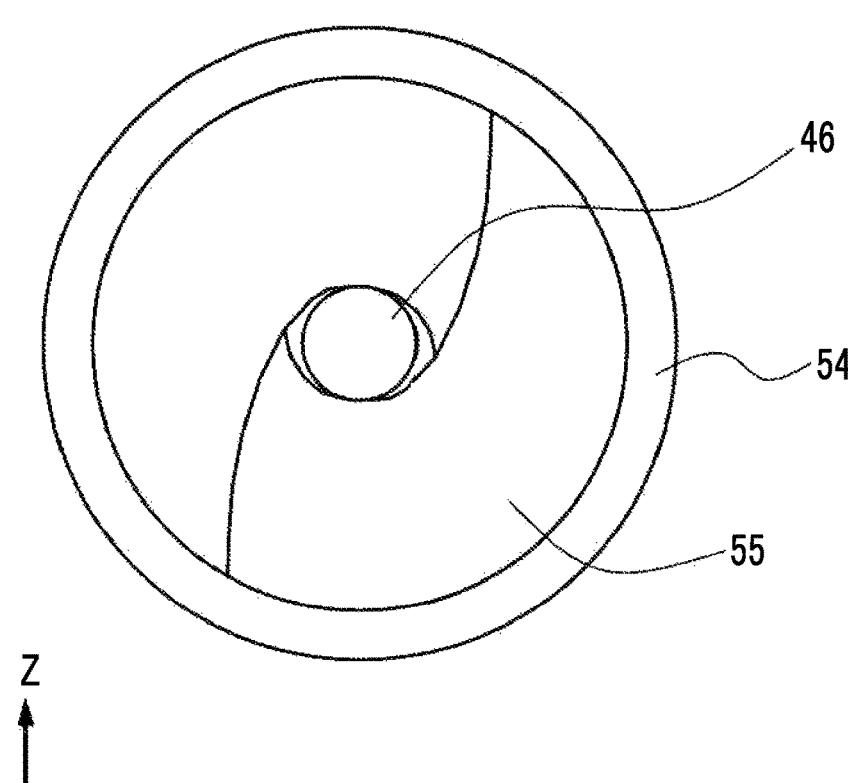
FIG. 8 is a conceptual diagram showing an example of the way in which the fixation mechanism fixes the fixation rod of the shake correction unit.

For example, as shown in FIG. 7, in a case where the fixation mechanism 50 is in the release state, the fixation rod 46 can freely move inside the openings 51a and 54a and the shake correction unit 30 can perform the anti-vibration operation. On the other hand, for example, as shown in FIG. 8, in a case where the fixation mechanism 50 is in the fixation state, the fixation rod 46 is held by the displacement member 55. Accordingly, the position of the shake correction unit 30 is fixed and the shake correction unit 30 cannot perform the anti-vibration operation. For example, in a case where the displacement member 55 enters the release state while the binocle 10 is being carried, the shake correction unit 30 is operated in the housing 11 and thus the fixation rod 46 may be damaged due to collision with the fixation mechanism 50. Therefore, it is desirable that the displacement member 55 is in the fixation state during a period in which the binocle 10 is off.

Figure 9:
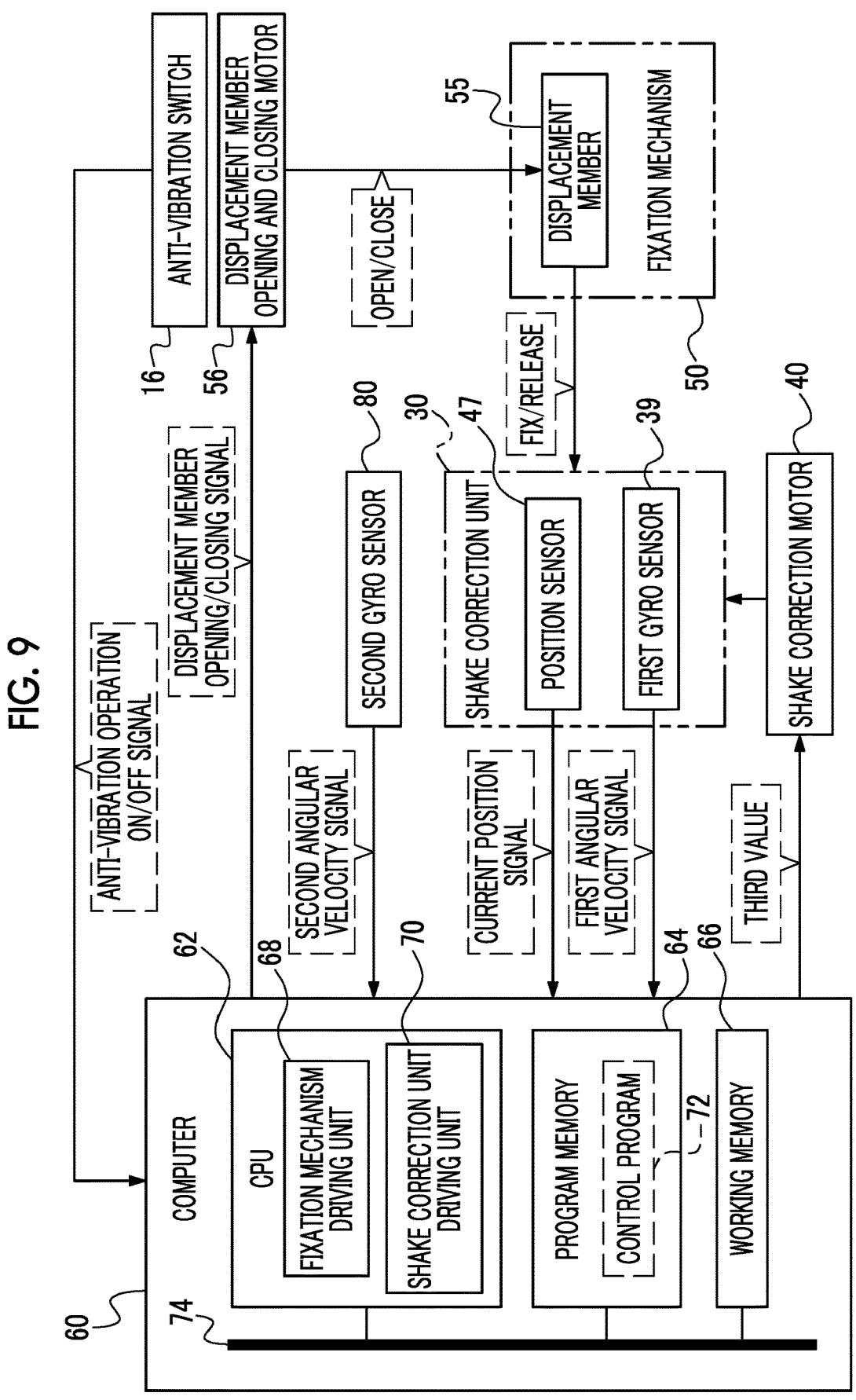
FIG. 9 is a block diagram showing an example of the electrical configuration of a binocle according to a first embodiment.

For example, as shown in FIG. 9, the housing 11 of the binocle 10 includes a computer 60. The computer 60 is mounted on a control substrate 58 (refer to FIG. 3) provided below the first holder 32 and the second holder 33.

The computer 60 includes a CPU 62, a program memory 64 and a working memory 66.

The CPU 62 is an example of a "processor" according to the present disclosed technology and collectively controls the operation of the binocle 10. The program memory 64 stores a control program 72, various parameters, and the like. The working memory 66 temporarily stores various information. The CPU 62, the program memory 64, and the working memory 66 are connected to each other by a bus 74.

As the CPU 62, a single-core processor is used. A multi-core processor may be used instead of the single-core processor. A volatile memory is used as the program memory 64. Here, a flash memory is used as the non-volatile memory. Another type of non-volatile memory such as an EEPROM or SSD may be used instead of the flash memory. A volatile memory is used as the working memory 66. Here, a DRAM is used as the volatile memory. Various types of volatile memories such as an SRAM may be used instead of the DRAM.

The CPU 62 reads the control program 72 from the program memory 64 and executes the read control program 72 on the working memory 66 to operate as a fixation mechanism driving unit 68 and a shake correction unit driving unit 70. The CPU 62 that operates as the shake correction unit driving unit 70 in such a manner constitutes an anti-vibration device together with the shake correction unit 30, the first gyro sensor 39, and the second gyro sensor 80. Note that the shake correction unit 30, the first gyro sensor 39, the CPU 62, and the second gyro sensor 80 are examples of "anti-vibration devices" according to the present disclosed technology.

The anti-vibration device is an integrated device. Here, the integrated device refers to a device that is integrated by means of the housing 11 without accessories such as a tripod or a focus demand. In the first embodiment, the integrated device is realized by accommodating at least the shake correction unit 30, the first gyro sensor 39, the CPU 62, and the second gyro sensor 80 in the housing 11.

The fixation mechanism driving unit 68 controls the displacement member opening and closing motor 56 such that the fixation mechanism 50 switches between the fixation state and the release state. Specifically, in a case where the anti-vibration switch 16 is turned on, an anti-vibration operation on signal is output to the fixation mechanism driving unit 68 of the computer 60. In a case where the fixation mechanism driving unit 68 receives the anti-vibration operation on signal, a displacement member opening signal is output to the displacement member opening and closing motor 56. In response to this, the displacement member opening and closing motor 56 is operated and a drive shaft of the displacement member opening and closing motor 56 is rotated in a direction for withdrawal of the displacement member 55 because of the displacement member opening signal and thus the fixation mechanism 50 switches from the fixation state to the release state.

On the other hand, in a case where the anti-vibration switch 16 is turned off, an anti-vibration operation off signal is output to the fixation mechanism driving unit 68 of the computer 60. In a case where the fixation mechanism driving unit 68 receives the anti-vibration operation off signal, a displacement member closing signal is output to the displacement member opening and closing motor 56. In response to this, the displacement member opening and closing motor 56 is operated and the drive shaft of the displacement member opening and closing motor 56 is rotated in a direction for causing the displacement member 55 to protrude and thus the fixation mechanism 50 switches from the release state to the fixation state.

The shake correction unit driving unit 70 performs anti-vibration control based on the first angular velocity signal output from the first gyro sensor 39 and the second angular velocity signal output from the second gyro sensor 80. Here, the first angular velocity signal is an example of a "first output value" according to the present disclosed technology, and the second angular velocity signal is an example of a "second output value" according to the present disclosed technology. Note that, in the first embodiment, the first angular velocity signal and the second angular velocity signal are examples of the first output value and the second output value according to the present disclosed technology. However, the present disclosed technology is not limited thereto. For example, the present disclosed technology is established even in a case where an acceleration signal indicating acceleration is applied instead of the angular velocity signal or together with the angular velocity signal.

Figure 11:
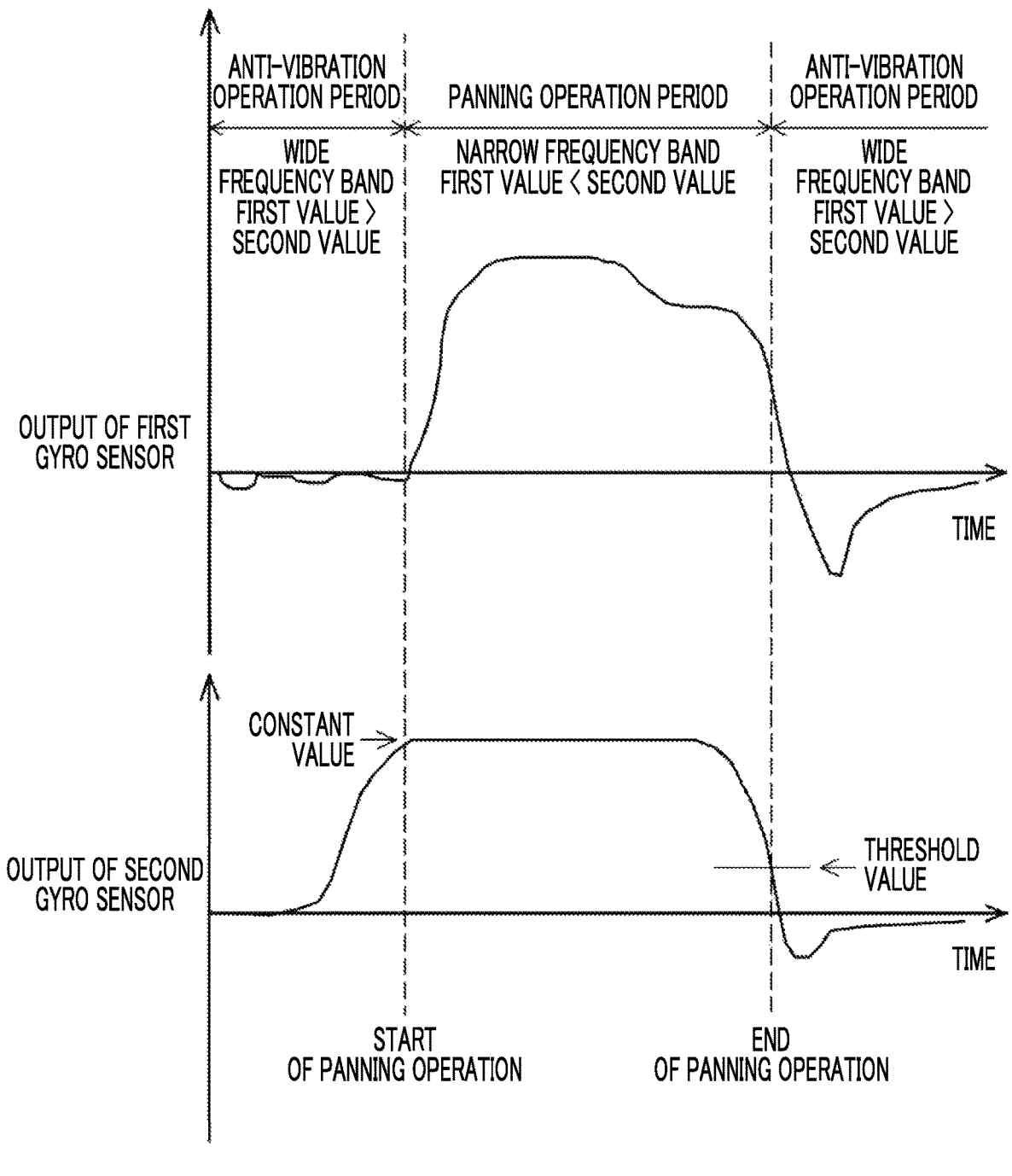
FIG. 11 is a graph showing an example of the outputs of first and second gyro sensors during an anti-vibration operation period and a panning operation period of the binocle according to the first embodiment.
Figure 12:
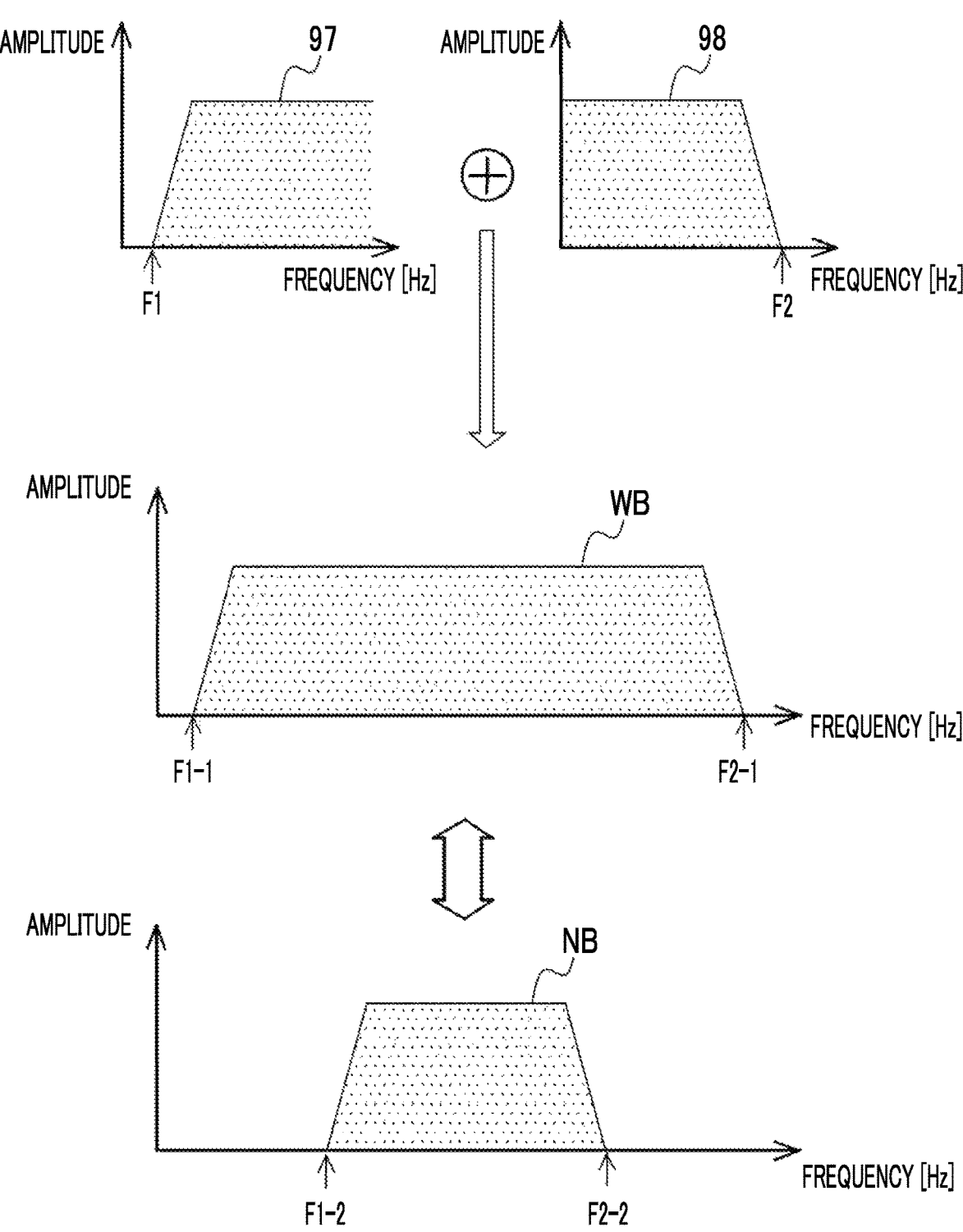
FIG. 12 is a conceptual diagram showing an example of a wide frequency band and a narrow frequency band set by a filter function of the first gyro sensor in the binocle according to the first embodiment.

Anti-vibration control performed by the shake correction unit driving unit 70 will be described below with reference to FIGS. 10 to 12.

Figure 10:
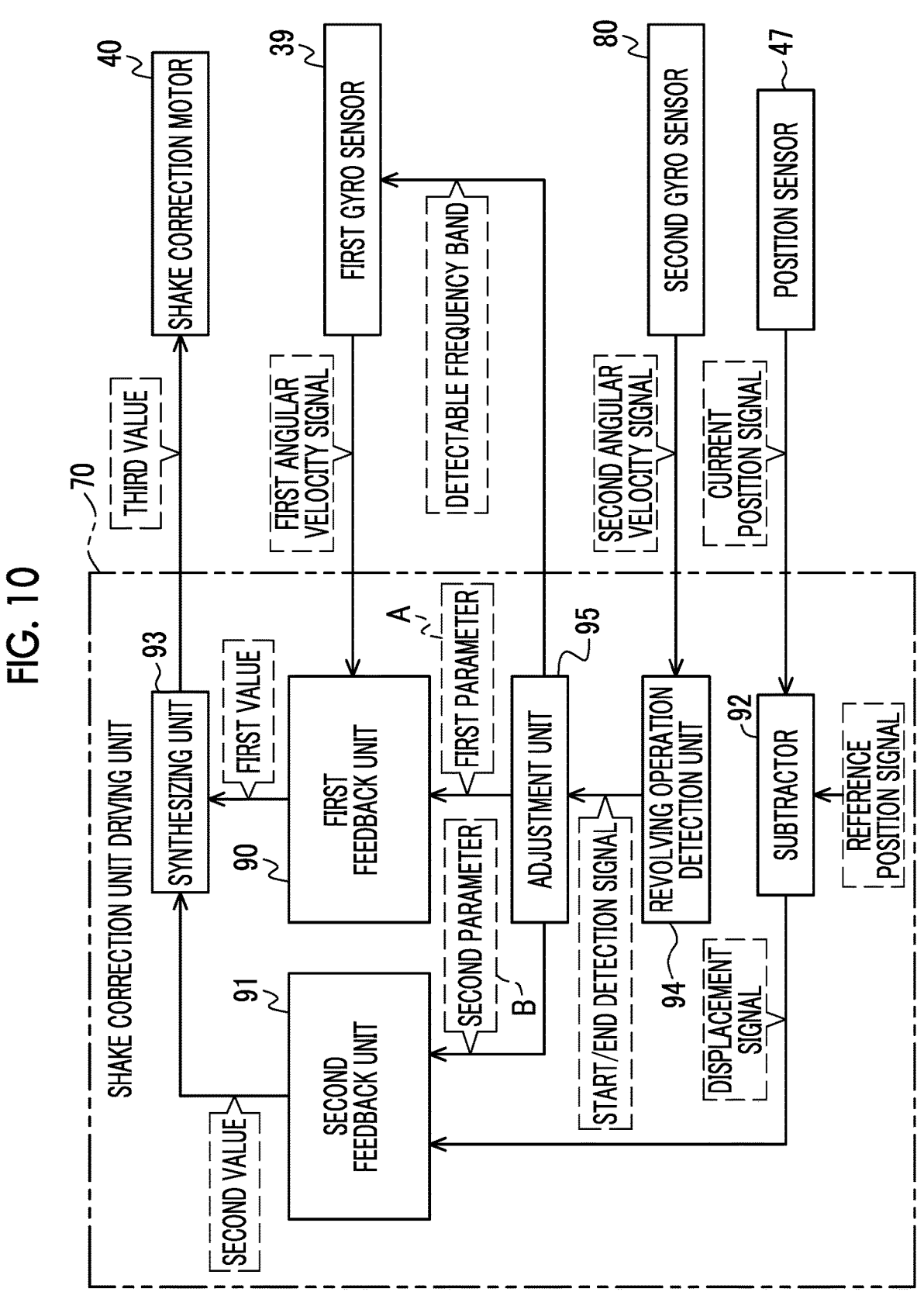
FIG. 10 is a block diagram showing an example of the main functions of the binocle according to the first embodiment.

For example, as shown in FIG. 10, the shake correction unit driving unit 70 includes a first feedback unit 90, a second feedback unit 91, a subtractor 92, a synthesizing unit 93, a revolving operation detection unit 94, and an adjustment unit 95.

The first feedback unit 90 obtains a first value based on the first angular velocity signal output from the first gyro sensor 39. The first value refers to a value related to a driving force of the shake correction motor 40 based on the result of the detection performed by the first gyro sensor 39, that is, a value related to a driving force for driving the shake correction motor 40 to correct an image shake caused by rotation of the shake correction unit 30 (for example, gain applied to shake correction motor 40). The first feedback unit 90 outputs the first value to the synthesizing unit 93.

The second feedback unit 91 obtains a second value based on a displacement signal output from the subtractor 92. The second value refers to a value related to a driving force for driving the shake correction motor 40 in a direction for aligning the shake correction unit 30 with a reference position S (for example, gain applied to shake correction motor 40). Here, the reference position S refers to, for example, the position of the shake correction unit 30 fixed by the fixation mechanism 50 as shown in FIG. 3.

A reference position signal indicating the reference position S of the shake correction unit 30 is given to the subtractor 92. The subtractor 92 subtracts the reference position signal from the current position signal output from the position sensor 47 to output a displacement signal indicating displacement of the shake correction unit 30 from the reference position S.

The synthesizing unit 93 obtains a third value based on the first value and the second value and outputs the third value to the shake correction motor 40. The third value is a value indicating a driving force for driving the shake correction motor 40 (for example, current or voltage input to shake correction motor 40) and is obtained in a case where the synthesizing unit 93 synthesizes the first value and the second value. Here, synthesis performed by the synthesizing unit 93 refers to, for example, addition and calculation performed by means of constants.

Here, the shake correction unit driving unit 70 adjusts the third value by changing the degree of difference between the first value and the second value. The degree of difference refers to, for example, a ratio between the first value and the second value. The shake correction unit driving unit 70 adjusts the third value to change the driving force for driving the shake correction motor 40 and the shake correction unit driving unit 70 controls the shake correction unit 30 in this manner.

For example, regarding the third value, in a case where the ratio of the first value is made higher than the ratio of the second value, the accuracy of the anti-vibration operation is improved in comparison with a case where the ratio of the second value is made higher than the ratio of the first value since the first value is a value related to a driving force to be applied to the shake correction motor 40 for the purpose of image shake correction. Meanwhile, regarding the third value, in a case where the ratio of the second value is made higher than the ratio of the first value, the shake correction unit 30 is likely to stay at the reference position S regardless of the magnitude of vibration applied thereto in comparison with a case where the ratio of the first value is made higher than the ratio of the second value since the second value is a value related to a driving force applied to the shake correction motor 40 for the purpose of aligning the shake correction unit 30 with the reference position S. This is effective, for example, in preventing damage to the shake correction unit 30 in a case where excessive vibration is applied to the binocle 10.

The revolving operation detection unit 94 monitors the second angular velocity signal output from the second gyro sensor 80 during a period in which the anti-vibration operation is performed by means of the shake correction unit 30 (hereinafter, referred to as "anti-vibration operation period") so as to detect the state of use of the binocle 10. Here, the state of use refers to the state of the binocle 10 in use and refers to, for example, the start and the end of a revolving operation. The revolving operation refers to, for example, an operation of continuously changing the direction of observation with the binocle 10 with the position of the user using the binocle 10 as an axis. The revolving operation includes at least one of a panning operation of changing the direction of observation in the X-axis direction or a tilting operation of changing the direction of observation in the Z-axis direction. Hereinafter, anti-vibration control that is performed by the shake correction unit driving unit 70 during a period in which the panning operation is performed (hereinafter, referred to as "panning operation period") will be described while using the panning operation as an example. Note that the panning operation is merely an example, and the anti-vibration control may be performed by the shake correction unit driving unit 70 during a period in which the tilting operation is performed (hereinafter, referred to as "tilting operation period") in the same manner as the anti-vibration control performed by the shake correction unit driving unit 70 during the panning operation period. In addition, the anti-vibration control during the panning operation period and the anti-vibration control during the tilting operation period may be performed by the shake correction unit driving unit 70 in parallel.

In a case where the panning operation is performed, the second gyro sensor 80 detects vibration of the housing 11 rotating at a constant speed in one of the X-axis directions. That is, for example, as shown in the lower graph of FIG. 11, the second angular velocity signal output from the second gyro sensor 80 is maintained at a constant value during the panning operation. The revolving operation detection unit 94 monitors the second angular velocity signal and determines that the panning operation is being performed in a case where the second angular velocity signal is maintained at a constant value other than zero for a predetermined time. In this case, the revolving operation detection unit 94 detects a time at which the second angular velocity signal reaches the constant value (in example shown in lower graph of FIG. 11, time at which rise of output of second gyro sensor 80 is completed) as a time at which the panning operation has been started.

In addition, the revolving operation detection unit 94 determines that the panning operation has ended in a case where the second angular velocity signal decreases to zero after the second angular velocity signal is maintained at the constant value other than zero for the predetermined time (for example, about several hundred ms (milliseconds). Here, the predetermined time is, for example, a time that is derived as the lower limit of a time for which the panning operation is performed through a test with an actual device and/or computer simulation.

The revolving operation detection unit 94 detects a time at which the second angular velocity signal reaches a predetermined threshold value as a time at which the panning operation has ended. Here, the predetermined threshold value is, for example, zero. Note that zero is merely an example, and for example, the predetermined threshold value only needs to be a value (for example, value other than zero that is close to zero) that is derived as the value of the second angular velocity signal at the time of the end of the panning operation through a test with an actual device and/or computer simulation.

For example, as shown in FIG. 10, in a case where the revolving operation detection unit 94 detects the start of the panning operation, the revolving operation detection unit 94 transmits a start detection signal (refer to FIG. 10) indicating that the start of the panning operation has been detected to the adjustment unit 95 and in a case where the revolving operation detection unit 94 detects the end of the panning operation, the revolving operation detection unit 94 transmits an end detection signal (refer to FIG. 10) indicating that the end of the panning operation has been detected to the adjustment unit 95. The adjustment unit 95 determines a period from reception of the start detection signal to reception of the end detection signal as the panning operation period. The adjustment unit 95 changes the settings of filter functions in the first gyro sensor 39 during the anti-vibration operation period and the panning operation period. In addition, the adjustment unit 95 changes parameters given to the first feedback unit 90 and the second feedback unit 91 during the anti-vibration operation period and the panning operation period.

First, the settings of the filter functions in the first gyro sensor 39 will be described. For example, as shown in FIG. 12, the first gyro sensor 39 includes, as the filter functions, a high-pass filter (HPF) that removes a signal of the frequency is equal to or lower than a first frequency F1 and a low-pass filter (LPF) that removes a signal of which the frequency is equal to or higher than a second frequency F2. In the upper part of FIG. 12, a reference numeral "97" shows an example of an output signal through the HPF, and a reference numeral "98" shows an example of an output signal through the LPF. The first frequency F1 and the second frequency F2 are changeable. In a case where the second frequency F2 is set to a value higher than the first frequency F1, the first gyro sensor 39 can output signals of a frequency band of which the lower limit is the first frequency F1 and the upper limit is the second frequency F2 by using the filter functions.

The first frequency F1 and the second frequency F2 are set by the adjustment unit 95. For example, as shown in FIG. 12, the adjustment unit 95 changes the detectable frequency band of the first gyro sensor 39 (hereinafter, simply referred to as "detectable frequency band") between a wide frequency band WB (refer to middle part of FIG. 12) between a first frequency F1-1 and a second frequency F2-1 and a narrow frequency band NB (refer to lower part of FIG. 12) between a first frequency F1-2 and a second frequency F2-2. Note that, for example, as shown in FIG. 12, the value of the first frequency F1-2 of the narrow frequency band NB is higher than the first frequency F1-1 of the wide frequency band WB and the value of the second frequency F2-2 is lower than the second frequency F2-1 of the wide frequency band WB. In addition, the wide frequency band WB and the narrow frequency band NB only need to satisfy a relationship of being relatively wide and narrow.

During the anti-vibration operation period, the adjustment unit 95 sets the detectable frequency band to the wide frequency band WB. In addition, in a case where the adjustment unit 95 receives the start detection signal, the adjustment unit 95 changes the detectable frequency band from the wide frequency band WB to the narrow frequency band NB. Accordingly, during the panning operation period, the detectable frequency band is made narrow in comparison with the anti-vibration operation period. That is, during the panning operation period, the first gyro sensor 39 detects vibration in the narrow frequency band NB narrower than the wide frequency band WB. Therefore, regarding the first value and the second value, the first value output from the first feedback unit 90 based on the first angular velocity signal is made relatively small and the second value is made relatively large. Therefore, the shake correction unit 30 can more easily follow the rotation of the housing 11 caused by the panning operation in comparison with a case where the detectable frequency band is fixed at all times.

Meanwhile, in a case where the adjustment unit 95 receives the end detection signal, the adjustment unit 95 changes the detectable frequency band from the narrow frequency band NB to the wide frequency band WB. Accordingly, during the anti-vibration operation period, the detectable frequency band is made wide in comparison with the panning operation period. Therefore, the first value is made larger than the second value and thus the accuracy of the anti-vibration operation is increased in comparison with a case where the detectable frequency band is fixed at all times.

Next, parameters given to the first feedback unit 90 and the second feedback unit 91 will be described. For example, as shown in FIG. 10, the adjustment unit 95 gives a first parameter A to the first feedback unit 90 and a second parameter B to the second feedback unit 91. The first feedback unit 90 outputs, for example, the product of the first angular velocity signal and the first parameter A as the first value. The second feedback unit 91 outputs, for example, the product of the displacement signal and the second parameter B as the second value. The synthesizing unit 93 outputs the sum of the first value and the second value as the third value. The first parameter A and the second parameter B are values used for normalization by being multiplied by the first angular velocity signal and the displacement signal, respectively, and are values dependent on the first angular velocity signal and the displacement signal. In addition, the adjustment unit 95 changes a ratio A:B (hereinafter, referred to as parameter ratio) between the first parameter A and the second parameter B so that the ratio between the first value and the second value in the third value is changed.

During the panning operation period, the adjustment unit 95 sets the parameter ratio such that the second value is made larger than the first value. Accordingly, the shake correction unit 30 easily follows the rotation of the housing 11 caused by the panning operation in comparison with a case where the parameter ratio is set such that the first value is made larger than the second value. Meanwhile, during the anti-vibration operation period, the adjustment unit 95 sets the parameter ratio such that the first value is made larger than the second value. Accordingly, the accuracy of the anti-vibration operation performed by the shake correction unit 30 is improved in comparison with a case where the parameter ratio is set such that the second value is made larger than the first value.

As described above, with the detectable frequency band and the parameter ratio being changed, the shake correction unit 30 is driven in a direction to be aligned with the reference position S during the panning operation period. For example, as shown in the upper part of FIG. 11, in a case where the panning operation is started, the first angular velocity signal output from the first gyro sensor 39 increases.

This is because, for example, the shake correction unit 30, which has been largely displaced from the reference position S because of the anti-vibration operation during the anti-vibration operation period, is driven in a direction to be aligned with the reference position S since the start of the panning operation is detected. Thereafter, the shake correction unit 30 follows the rotation of the housing 11 while maintaining a state of being aligned with the reference position S, and thus a value similar to the second angular velocity signal is output as the first angular velocity signal.

Figure 13:
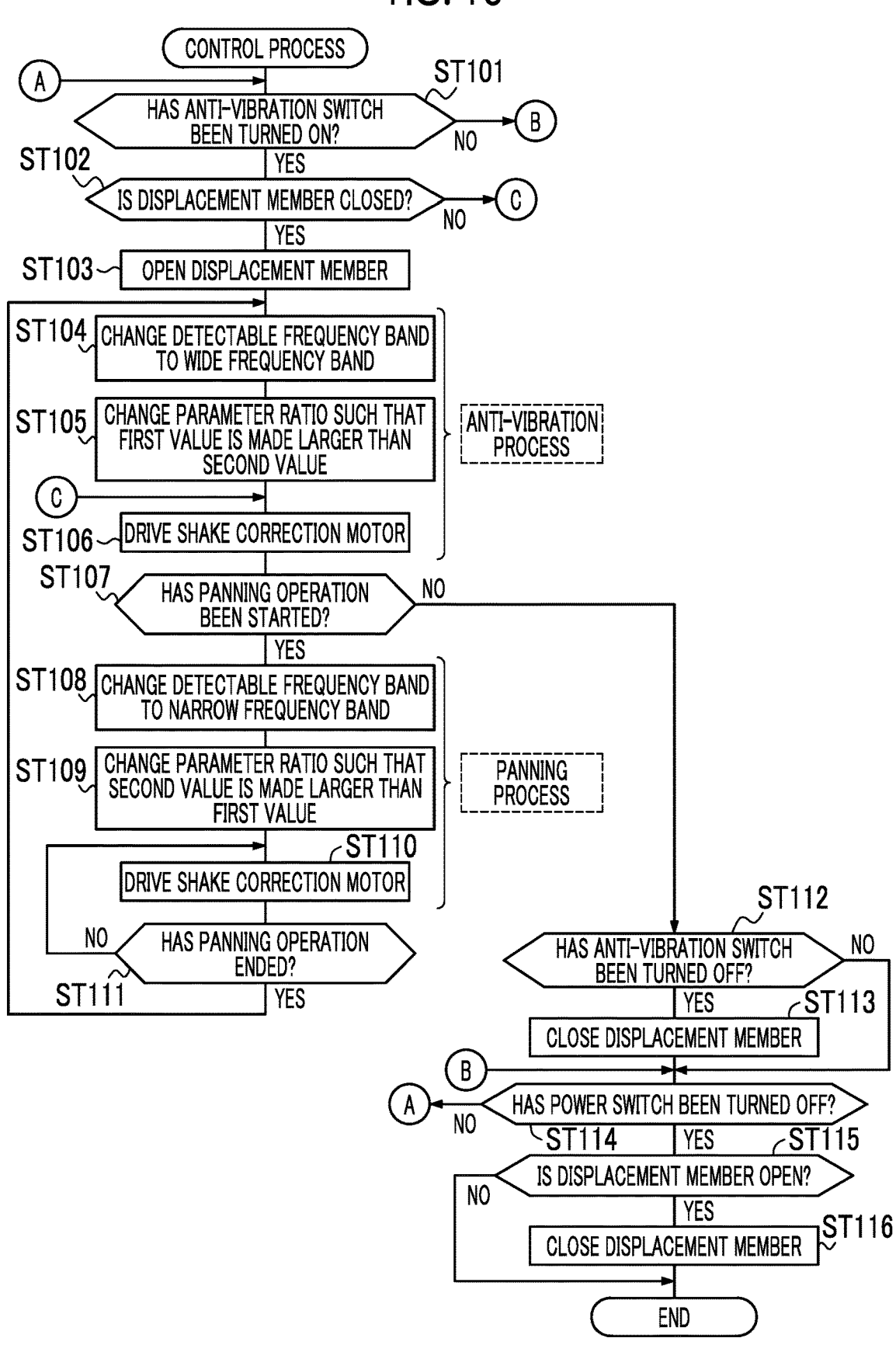
FIG. 13 is a flowchart showing an example of a control process for the binocle according to the first embodiment.

Next, the action of the binocle 10 according to the first embodiment will be described with reference to FIG. 13. Note that a control process shown in FIG. 13 is performed by the CPU 62 executing the control program 72. In addition, the control process shown in FIG. 13 is started in a case where the power switch 15 is turned on.

In the control process shown in FIG. 13, first, in step ST101, the fixation mechanism driving unit 68 determines whether or not the anti-vibration switch 16 has been turned on. In a case where it is determined that the anti-vibration switch 16 has been turned on in step ST101, the control process transitions to step ST102 since the result of the determination is positive. In a case where it is determined that the anti-vibration switch 16 has been turned on in step ST101, the control process transitions to step ST114 since the result of the determination is negative.

In step ST102, the fixation mechanism driving unit 68 determines whether or not the displacement member 55 is closed. In a case where it is determined that the displacement member 55 is closed in step ST102, the control process transitions to step ST103 since the result of the determination is positive. In a case where it is determined that the displacement member 55 is open in step ST102, the control process transitions to step ST106 since the result of the determination is negative.

In step ST103, the fixation mechanism driving unit 68 drives the displacement member opening and closing motor 56 to displace the displacement member 55 to the release position. Thereafter, the control process transitions to step ST104.

In step ST104, the shake correction unit driving unit 70 changes the detectable frequency band to the wide frequency band WB. Thereafter, the control process transitions to step ST105.

In step ST105, the shake correction unit driving unit 70 changes the parameter ratio such that the first value is made larger than the second value. Thereafter, the control process transitions to step ST106.

In step ST106, the shake correction unit driving unit 70 drives the shake correction motor 40 by outputting the third value calculated based on the first value and the second value to the shake correction motor 40. The shake correction unit 30 is controlled with the shake correction motor 40 driven. As described above, regarding the third value, the first value is set to be larger than the second value in an anti-vibration process performed in steps ST104 to ST106. Therefore, the accuracy of the anti-vibration operation performed by the shake correction unit 30 is improved in comparison with a case where the second value is set to be larger than the first value. After the process of step ST106 is performed, the control process transitions to step ST107.

In step ST107, the revolving operation detection unit 94 determines whether or not the panning operation of the housing 11 has been started by monitoring the second angular velocity signal. In a case where it is determined that the panning operation has been started in step ST107, the control process transitions to step ST108 since the result of the determination is positive. In a case where it is determined that the panning operation has not been started in step ST107, the control process transitions to step ST112 since the result of the determination is negative.

In step ST108, the shake correction unit driving unit 70 changes the detectable frequency band to the narrow frequency band NB. Thereafter, the control process transitions to step ST109.

In step ST109, the shake correction unit driving unit 70 changes the parameter ratio such that the second value is made larger than the first value. Thereafter, the control process transitions to step ST110.

In step ST110, the shake correction unit driving unit 70 drives the shake correction motor 40 by outputting the third value calculated based on the first value and the second value to the shake correction motor 40. The shake correction unit 30 is controlled with the shake correction motor 40 driven. As described above, regarding the third value, the second value is set to be larger than the first value in a panning process performed in steps ST108 to ST110. Therefore, the shake correction unit 30 easily follows the panning operation of the housing 11 in comparison with a case where the first value is set to be larger than the second value. After the process of step ST110 is performed, the control process transitions to step ST111.

In step ST111, the revolving operation detection unit 94 determines whether or not the panning operation of the housing 11 has ended by monitoring the second angular velocity signal. In a case where it is determined that the panning operation has ended in step ST111, the control process transitions to step ST104 since the result of the determination is positive. In a case where it is determined that the panning operation has not ended in step ST111, the control process transitions to step ST110 since the result of the determination is negative.

In step ST112, the fixation mechanism driving unit 68 determines whether or not the anti-vibration switch 16 has been turned off. In a case where it is determined that the anti-vibration switch 16 has been turned off in step ST112, the control process transitions to step ST113 since the result of the determination is positive. In a case where it is determined that the anti-vibration switch 16 has not been turned off in step ST112, the control process transitions to step ST114 since the result of the determination is negative.

In step ST113, the fixation mechanism driving unit 68 drives the displacement member opening and closing motor 56 to displace the displacement member 55 to the fixation position. Thereafter, the control process transitions to step ST114.

In step ST114, the fixation mechanism driving unit 68 determines whether or not the power switch 15 has been turned off. In a case where it is determined that the power switch 15 has been turned off in step ST114, the control process transitions to step ST115 since the result of the determination is positive. In a case where it is determined that the power switch 15 has not been turned off in step ST114, the control process transitions to step ST101 since the result of the determination is negative.

In step ST115, the fixation mechanism driving unit 68 determines whether or not the displacement member 55 is open. In a case where it is determined that the displacement member 55 is open in step ST115, the control process transitions to step ST116 since the result of the determination is positive. In a case where it is determined that the displacement member 55 is closed in step ST115, the control process ends since the result of the determination is negative.

In step ST116, the fixation mechanism driving unit 68 drives the displacement member opening and closing motor 56 to displace the displacement member 55 to the fixation position. Thereafter, the control process ends.

As described above, the anti-vibration device according to the first embodiment includes the shake correction unit 30, the first gyro sensor 39 disposed in the shake correction unit 30, the second gyro sensor 80 disposed outside the shake correction unit 30, and the CPU 62. The shake correction unit driving unit 70 of the CPU 62 performs anti-vibration control based on the first angular velocity signal output from the first gyro sensor 39 and the second angular velocity signal output from the second gyro sensor 80. Therefore, with the binocle 10 according to the first embodiment, it is possible to realize anti-vibration matching the state of use of the binocle 10.

The anti-vibration device according to the first embodiment is an integrated device. Specifically, the anti-vibration device includes the housing 11 that accommodates the shake correction unit 30 and the second gyro sensor 80 is disposed in the housing 11. The integrated device refers to, for example, a device integrated with the housing 11.

In the anti-vibration device according to the first embodiment, the vibration detection axis 38A of the X-axis gyro sensor 38 constituting the first gyro sensor 39 and the vibration detection axis 80A of the second gyro sensor 80 are parallel to the rotary shaft 28 of the shake correction unit 30. In addition, the vibration detection axis 37A of the Z-axis gyro sensor 37 constituting the first gyro sensor 39 and the vibration detection axis 80B of the second gyro sensor 80 are parallel to the rotary shaft 29 of the shake correction unit 30. Therefore, it is easy to compare the first angular velocity signal which is the output value of the first gyro sensor 39 with the second angular velocity signal which is the output value of the second gyro sensor 80 in comparison with a case where the vibration detection axes 38A and 37A of the first gyro sensor 39 and the vibration detection axes 80A and 80B of the second gyro sensor 80 are not parallel to the rotary shafts 28 and 29 of the shake correction unit 30.

In the anti-vibration device according to the first embodiment, the first gyro sensor 39 and the second gyro sensor 80 have sensitivities equivalent to each other. Therefore, it is easy to compare the first angular velocity signal with the second angular velocity signal in comparison with a case where the sensitivity of the first gyro sensor 39 and the sensitivity of the second gyro sensor 80 are different from each other.

In the anti-vibration device according to the first embodiment, a frequency band detectable by the second gyro sensor 80 is equivalent to a frequency band detectable by the first gyro sensor 39. Therefore, it is easy to compare the first angular velocity signal with the second angular velocity signal in comparison with a case where a frequency band detectable by the second gyro sensor 80 is different from a frequency band detectable by the first gyro sensor 39.

In the case of the anti-vibration device of the first embodiment, the shake correction unit driving unit 70 performs, in the anti-vibration control, control in which the first angular velocity signal is made close to a predetermined value (for example, zero). Therefore, it is possible to improve the anti-vibration performance for the binocle 10 in comparison with a case where the control in which the first angular velocity signal is made close to, for example, zero is not performed in the anti-vibration control.

In the anti-vibration device according to the first embodiment, the revolving operation detection unit 94 of the shake correction unit driving unit 70 detects the state of use of the anti-vibration device based on the second angular velocity signal and performs the anti-vibration control based on the result of the detection. Therefore, it is possible to accurately perform anti-vibration matching the state of use of the anti-vibration device in comparison with a case where the state of use of the anti-vibration device is not detected.

In the anti-vibration device according to the first embodiment, the state of use is the start and the end of the revolving operation of the anti-vibration device. Therefore, with this configuration, it is possible to realize anti-vibration in consideration of the start and the end of the revolving operation of the anti-vibration device.

In the anti-vibration device according to the first embodiment, the revolving operation is at least one of the panning operation or the tilting operation. Therefore, it is possible to realize anti-vibration matching the panning operation and/or the tilting operation.

In the anti-vibration device according to the first embodiment, the detectable frequency band can be changed. The shake correction unit driving unit 70 sets the detectable frequency band to the wide frequency band WB in a case where the anti-vibration operation is to be performed by the shake correction unit 30. In addition, the shake correction unit driving unit 70 changes the detectable frequency band to the narrow frequency band NB in a case where the start of the panning operation of the housing 11 is detected. Therefore, the shake correction unit 30 easily follows the revolving operation of the housing 11 during the panning operation period in comparison with a case where the detectable frequency band is not changed.

In the anti-vibration device according to the first embodiment, the shake correction unit driving unit 70 changes the detectable frequency band from the narrow frequency band NB to the wide frequency band WB in a case where the end of the panning operation of the housing 11 is detected. Therefore, it is possible to accurately perform the anti-vibration operation during the anti-vibration operation period in comparison with a case where the detectable frequency band is not changed.

The binocle 10 according to the first embodiment includes the anti-vibration device, the right eye optical system, and the left eye optical system. Therefore, it is possible to realize anti-vibration matching the state of use of the binocle 10 in comparison with a case where the binocle 10 does not include the anti-vibration device.

In the binocle 10 according to the first embodiment, the first gyro sensor 39 is disposed at the center of a space between the right eye optical system and the left eye optical system. Therefore, it is possible to accurately perform anti-vibration for the binocle 10 in comparison with a case where the first gyro sensor 39 is disposed at a position other than the center of the space between the right eye optical system and the left eye optical system.

Note that, in the first embodiment, the revolving operation detection unit 94 detects the start and the end of the revolving operation of the housing 11 based on the second angular velocity signal. However, the present disclosed technology is not limited thereto and the revolving operation detection unit 94 may detect only one of the start or the end of the revolving operation of the housing 11.

Note that, in the first embodiment, the revolving operation detection unit 94 detects the start and the end of the revolving operation of the housing 11 as the state of use based on the second angular velocity signal. However, the present disclosed technology is not limited thereto and a camera shake of a user may also be included. In addition, for example, a state resulting from the use environment of the binocle 10 may be detected as the state of use. Here, examples of the use environment of the binocle 10 include an environment on the sea where vibrations caused by waves are applied to the binocle 10 and an environment inside a vehicle where vibrations from road surfaces such as roads or railroad tracks and vibrations caused by an engine or a motor are applied to the binocle 10. Accordingly, it is possible to realize anti-vibration matching the use environment of the binocle 10.

Second Embodiment

Figure 14:
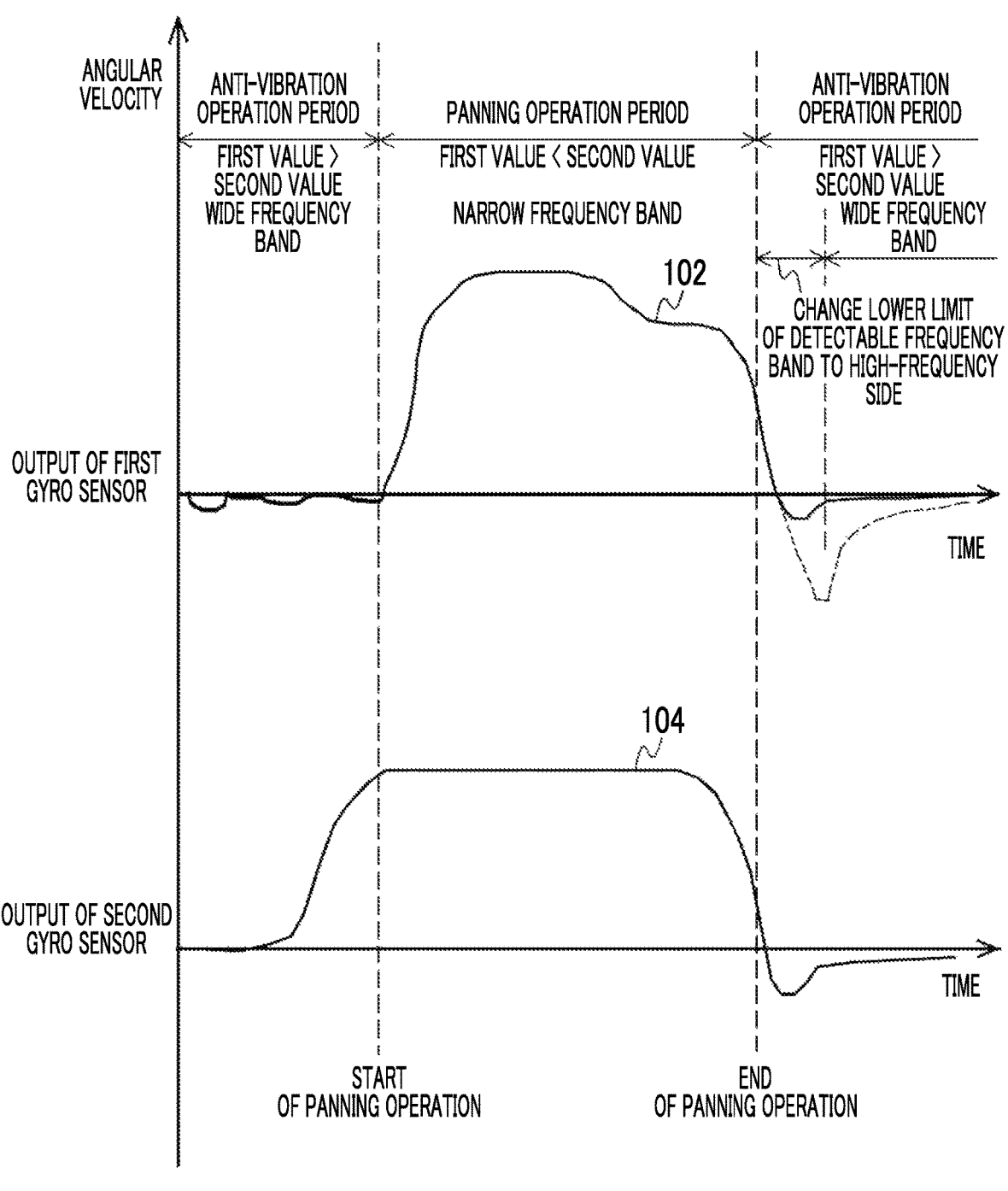
FIG. 14 is a graph showing an example of the outputs of first and second gyro sensors during an anti-vibration operation period and a panning operation period of a binocle according to a second embodiment.

Because of the filter functions of the first gyro sensor 39, the first gyro sensor 39 has a characteristic that an output signal swings to a negative side in a case where an input signal falls down to zero. For example, as shown in FIG. 14, a second angular velocity signal 104 output from the second gyro sensor 80 falls down toward zero at the timing of the end of the panning operation of the housing 11. Although a first angular velocity signal 102 output from the first gyro sensor 39 also falls toward zero at the end of the panning operation, the first angular velocity signal 102 considerably swings to the negative side as represented by a dotted line in FIG. 14.

Therefore, in a second embodiment, in a case where the revolving operation detection unit 94 detects the end of the panning operation by monitoring the second angular velocity signal 104, the adjustment unit 95 changes the value of the first frequency F1 set for the HPF of the first gyro sensor 39 (that is, lower limit of detectable frequency band) to a high-frequency side. Accordingly, the first angular velocity signal 102 is restrained from swinging to the negative side. After a predetermined time (for example, about several hundred ms (milliseconds)) elapses, the adjustment unit 95 changes the detectable frequency band to the wide frequency band WB as with the first embodiment. Therefore, the anti-vibration operation for the binocle 10 is accurately performed.

As described above, according to the second embodiment, in a case where the revolving operation detection unit 94 detects the end of the panning operation, the adjustment unit 95 changes the lower limit of the detectable frequency band to the high-frequency side. Therefore, a noise of the first angular velocity signal caused by the filter functions can be quickly converged in comparison with a case where the lower limit of the detectable frequency band is not changed to the high-frequency side.

Third Embodiment

Figure 15:
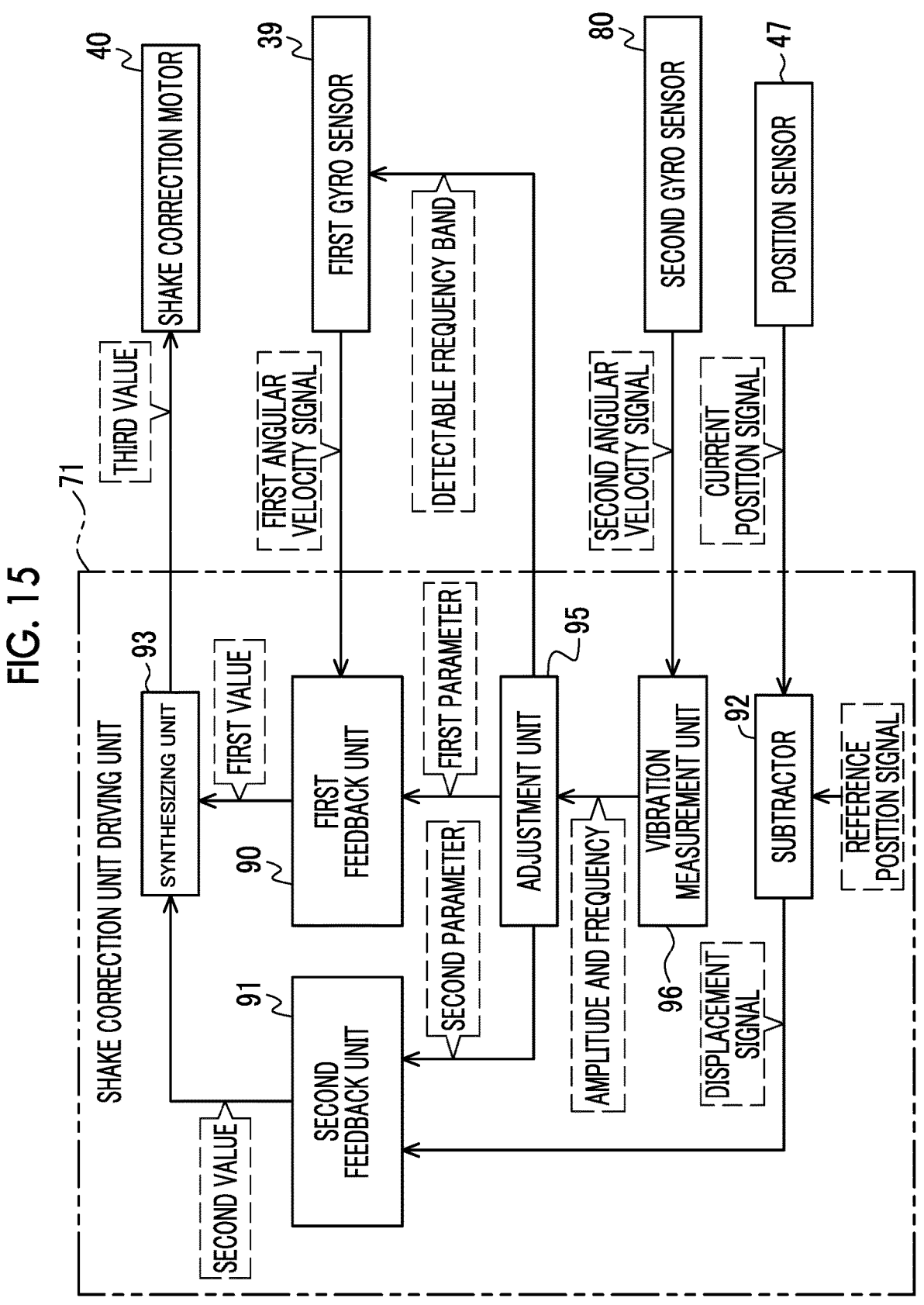
FIG. 15 is a block diagram showing an example of the main functions of a binocle according to a third embodiment.

For example, as shown in FIG. 15, a shake correction unit driving unit 71 according to a third embodiment includes a vibration measurement unit 96 instead of the revolving operation detection unit 94. Other configurations of the shake correction unit driving unit 71 are the same as those of the shake correction unit driving unit 70 according to the first embodiment.

The vibration measurement unit 96 measures the amplitude and the frequency of vibration applied to the housing 11 based on the second angular velocity signal output from the second gyro sensor 80. The vibration measurement unit 96 outputs the measured amplitude and frequency to the adjustment unit 95. The adjustment unit 95 adjusts the detectable frequency band and the parameter ratio based on the amplitude and frequency input thereto.

Figure 16:
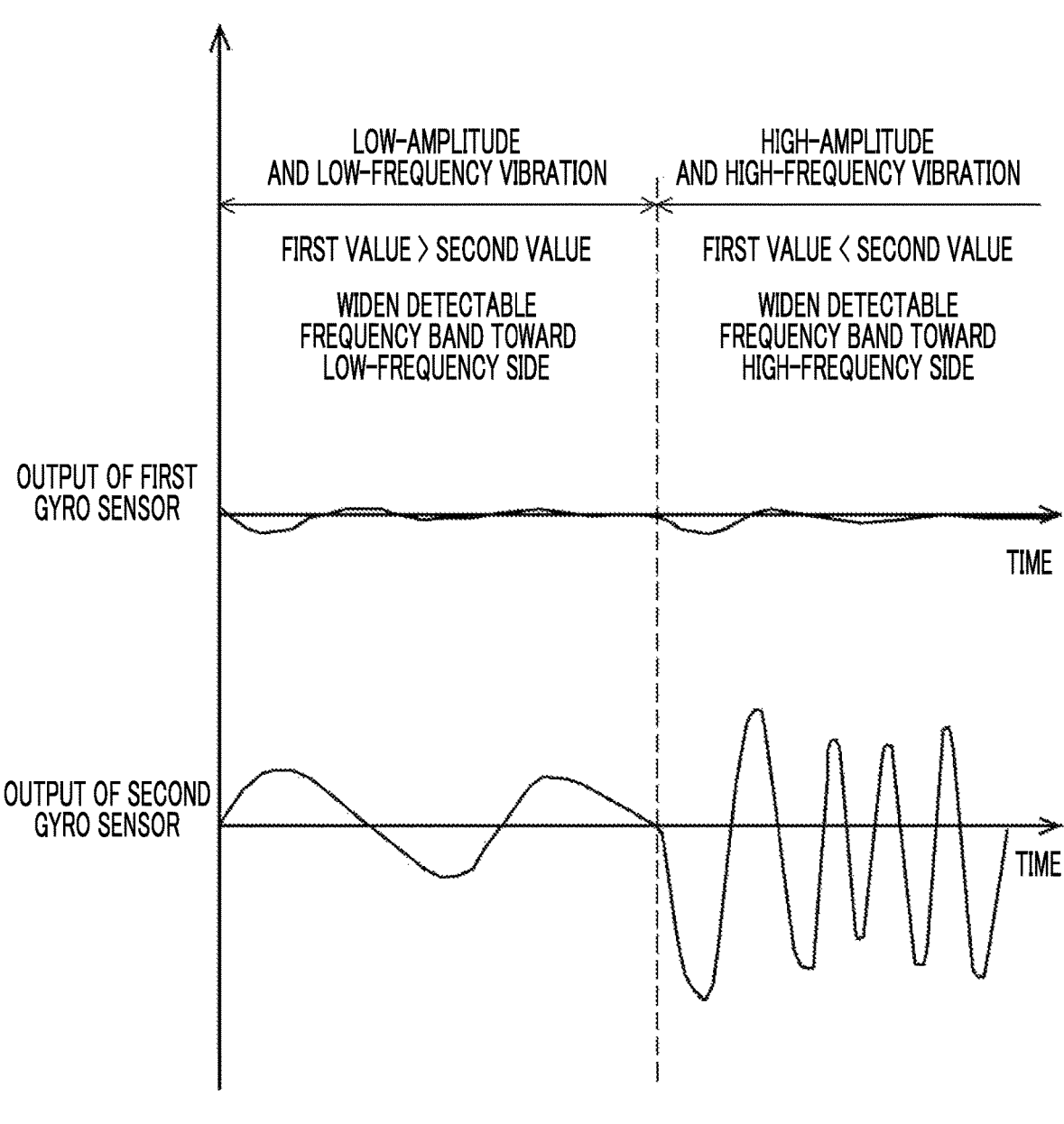
FIG. 16 is a graph showing an example of the outputs of first and second gyro sensors in the case of application of low-amplitude and low-frequency vibration and high-amplitude and high-frequency vibration to the binocle according to the third embodiment.
Figure 17:
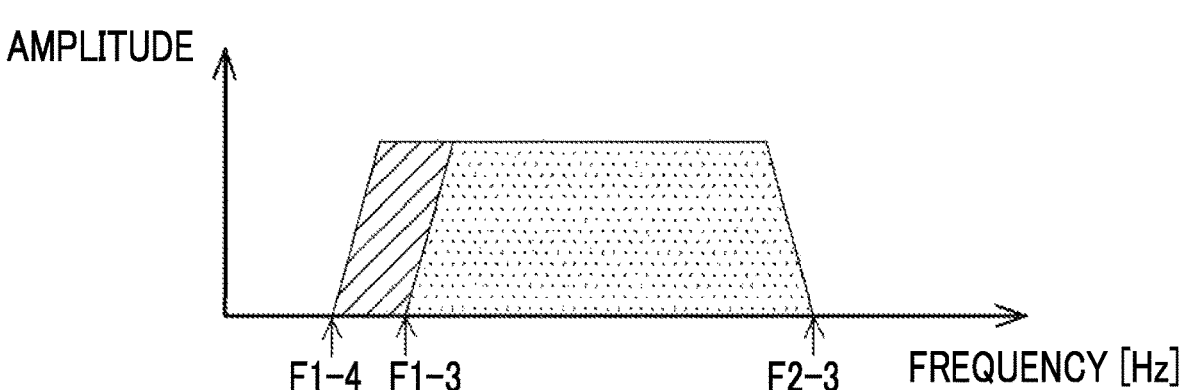
FIG. 17 is a graph showing an example of the way in which the lower limit of a detectable frequency band of the first gyro sensor is changed in a case where low-amplitude and low-frequency vibration is applied to the binocle according to the third embodiment.

More specifically, for example, as shown in FIG. 16, in a case where the amplitude measured by the vibration measurement unit 96 is lower than a preset value and the frequency is lower than a preset value (that is, in case of low-amplitude and low-frequency vibration), the adjustment unit 95 sets the parameter ratio such that the first value is made larger than the second value. Accordingly, the anti-vibration performance with respect to low-amplitude vibration is improved. In addition, the adjustment unit 95 widens the detectable frequency band toward a low-frequency side. Specifically, as shown in FIG. 17, the adjustment unit 95 changes, with respect to the detectable frequency band between a first frequency F1-3 and a second frequency F2-3, the first frequency to F1-4 which is a lower value than F1-3. Accordingly, the anti-vibration performance with respect to low-frequency vibration is improved.

Figure 18:
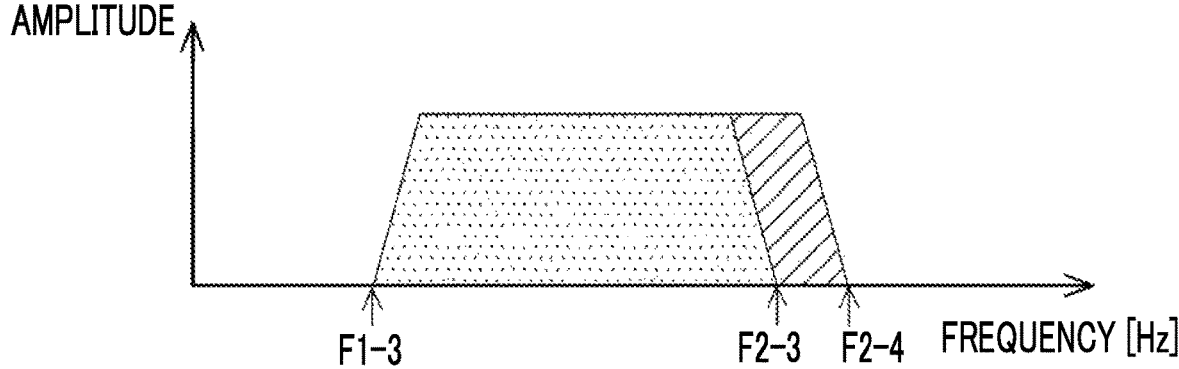
FIG. 18 is a graph showing an example of the way in which the upper limit of the detectable frequency band of the first gyro sensor is changed in a case where high-amplitude and high-frequency vibration is applied to the binocle according to the third embodiment.

In addition, for example, as shown in FIG. 16, in a case where the amplitude measured by the vibration measurement unit 96 is higher than the preset value and the frequency is higher than a preset value (that is, in case of high-amplitude and high-frequency vibration), the adjustment unit 95 sets the parameter ratio such that the second value is made larger than the first value. Accordingly, the anti-vibration performance with respect to high-amplitude vibration is improved. In addition, the adjustment unit 95 widens the detectable frequency band toward a high-frequency side. Specifically, as shown in FIG. 18, the adjustment unit 95 changes, with respect to the detectable frequency band between the first frequency F1-3 and the second frequency F2-3, the second frequency to F2-4 which is a higher value than F2-3. Accordingly, the anti-vibration performance with respect to high-frequency vibration is improved.

As described above, according to the third embodiment, the vibration measurement unit 96 measures the frequency of vibration applied to the binocle 10 based on the second angular velocity signal and the adjustment unit 95 widens the detectable frequency band toward at least one of the high-frequency side or the low-frequency side in accordance with the measured frequency. Therefore, the anti-vibration performance with respect to at least one of high-frequency vibration or low-frequency vibration can be improved in comparison with a case where the detectable frequency band is constant at all times regardless of the frequency of vibration applied to the binocle 10.

Fourth Embodiment

Figure 19:
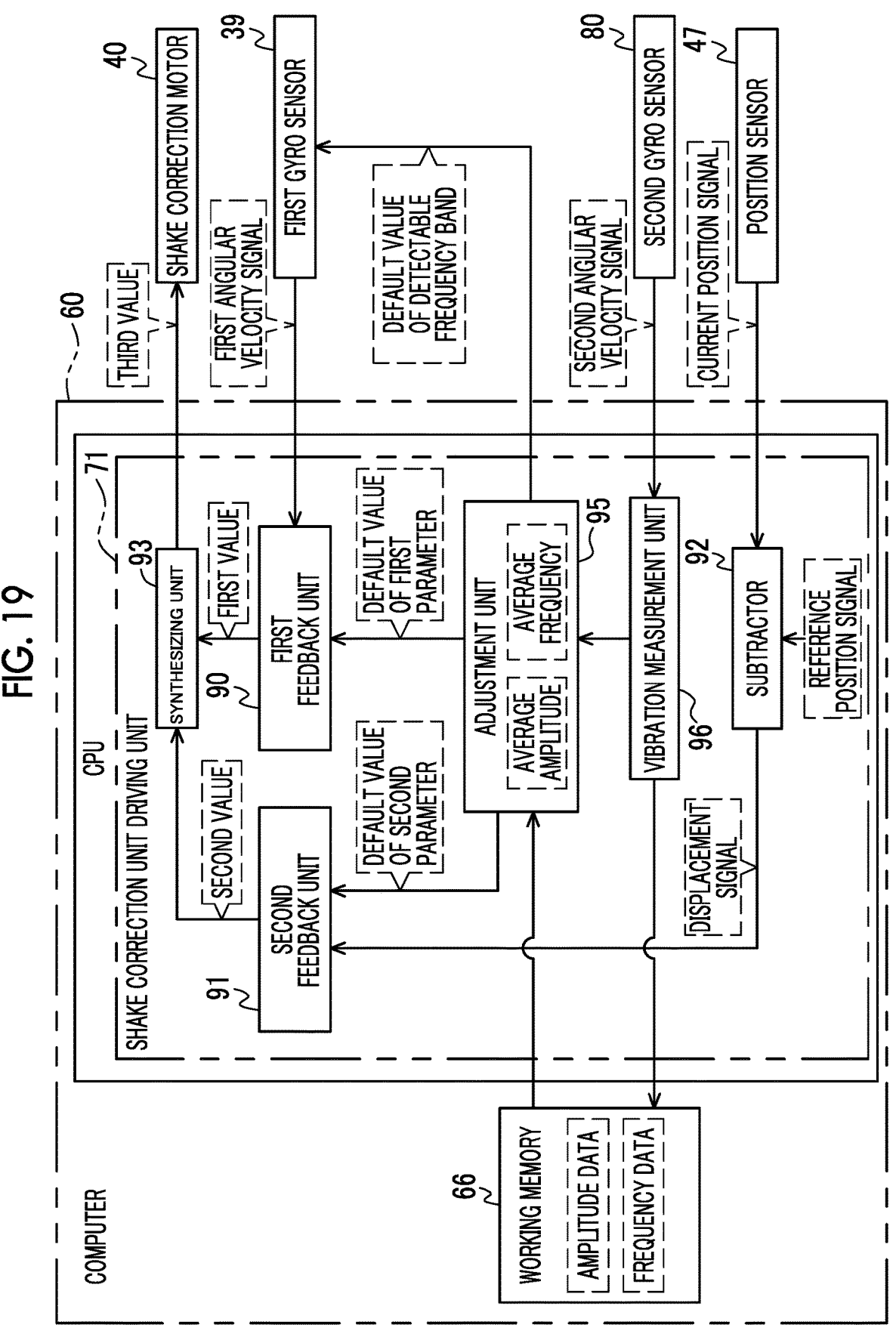
FIG. 19 is a block diagram showing an example of the main functions of a binocle according to a fourth embodiment.

For example, as shown in FIG. 19, the vibration measurement unit 96 according to a fourth embodiment stores, in the working memory 66 of the computer 60, amplitude data and frequency data of vibration measured based on the second angular velocity signal.

More specifically, during the anti-vibration control, the amplitude and the frequency of vibration are continuously sampled. The vibration measurement unit 96 measures the amplitude and the frequency for each period and averages the measured amplitudes and the measured frequencies. In a case where the amplitude and the frequency continuously change, the vibration measurement unit 96 recognizes that the state of use of the binocle 10 has been changed and stores, in the working memory 66, the latest average amplitude and the latest average frequency as one piece of environment data. The vibration measurement unit 96 repeats the above process during the anti-vibration control. In the case of the end of the anti-vibration control, the adjustment unit 95 selects the most frequent environment (for example, frequency of 7 Hz and small amplitude) based on the amplitude data and the frequency data that are stored in the working memory 66 until the end of the anti-vibration control and adopts the selected environment as the state of use of the binocle 10 in a case where the anti-vibration control is started next.

The adjustment unit 95 determines, based on the selected environment, a default value of the detectable frequency band and a default value of the parameter ratio. Here, the default value of the detectable frequency band refers to the value of the detectable frequency band that is set in the case of activation of the anti-vibration device composed of the shake correction unit 30, the first gyro sensor 39, the second gyro sensor 80, and the CPU 62 including the shake correction unit driving unit 71. Note that the anti-vibration device is activated in a case where the anti-vibration switch 16 is turned on and the fixation mechanism 50 enters the release state. Similarly, the default value of the parameter ratio refers to the parameter ratio that is set in the case of activation of the anti-vibration device. In other words, the adjustment unit 95 determines the control contents of the anti-vibration control in the case of activation of the anti-vibration device based on the selected average amplitude and the selected average frequency. Accordingly, the anti-vibration performance matching the vibration tendency is provided from the start of the anti-vibration operation.

As described above, according to the fourth embodiment, the vibration measurement unit 96 stores, in the working memory 66, the average values of the amplitudes and the frequencies of vibration that are measured based on the second angular velocity signal, and the adjustment unit 95 determines the control contents of the anti-vibration control in the case of activation of the anti-vibration device based on the amplitude and the frequency stored in the working memory 66. Therefore, it is possible to provide the anti-vibration performance matching the tendency of vibration immediately after activation of the anti-vibration device in comparison with a case where the control contents of the anti-vibration control in the case of activation of the anti-vibration device are not determined based on the amplitude and the frequency stored in the working memory 66.

In the fourth embodiment, the vibration measurement unit 96 determines the control contents of the anti-vibration control in the case of activation of the anti-vibration device based on the amplitude and the frequency stored in the working memory 66. However, the present disclosed technology is not limited thereto. The vibration measurement unit 96 may determine the control contents of the anti-vibration control in the case of activation of the anti-vibration device based on any one of the vibration or the frequency. In addition, although the vibration measurement unit 96 stores both of the amplitude data and the frequency data in the working memory 66, the vibration measurement unit 96 may store any one of the amplitude data or the frequency data in the working memory 66.

In addition, in the fourth embodiment, the adjustment unit 95 calculates an average amplitude and an average frequency from the amplitude data and the frequency data. However, the present disclosed technology is not limited thereto. The adjustment unit 95 may calculate a mode value or a median value instead of the average value of the amplitudes and the frequencies and may determine the control contents of the anti-vibration control in the case of activation of the anti-vibration device based on the mode value or the median value.

Fifth Embodiment

For example, as shown in FIG. 20, in a fifth embodiment, a matrix table 106 used to retrieve of the detectable frequency band and the parameter ratio based on the frequency and the amplitude of applied vibration is prepared in advance and stored in the working memory 66. In FIG. 20, frequency values X1, X2, . . . and so forth are written in a row direction of the matrix table 106, and amplitude values Y1, Y2, . . . and so forth are written in a column direction. In each cell in the matrix table 106, the detectable frequency band and the parameter ratio pre-set for each of combinations of frequencies and amplitudes are written. The matrix table 106 is obtained by calculating the detectable frequency band and the parameter ratio for obtaining the third value optimum for the anti-vibration control while changing the frequency and the amplitude of vibration applied to the binocle 10 through a test with an actual device and/or computer simulation. Here, the third value optimum for the anti-vibration control refers to a value related to a driving force for the shake correction motor 40 with which it is possible to cancel out an image shake caused by vibration as much as possible while preventing the fixation rod 46 and/or the fixation mechanism 50 from being damaged because of rotation of the shake correction unit 30.

The vibration measurement unit 96 measures the amplitude and frequency of vibration applied to the binocle 10 based on the second angular velocity signal, and outputs the measured amplitude and the measured frequency to the adjustment unit 95. The adjustment unit 95 refers to the matrix table 106 to acquire the detectable frequency band and the parameter ratio corresponding to the amplitude and the frequency input thereto. The adjustment unit 95 sets the first gyro sensor 39, the first feedback unit 90, and the second feedback unit 91 by using the acquired detectable frequency band and the acquired parameter ratio.

As described above, according to the fifth embodiment, the detectable frequency band and the parameter ratio are pre-set for each of combinations of the amplitudes and the frequencies of vibration applied to the binocle 10. Therefore, an appropriate detectable frequency band and an appropriate parameter ratio can be used in accordance with a combination of the amplitude and the frequency of vibration applied to the binocle 10.

Note that, in the fifth embodiment, the detectable frequency band and the parameter ratio pre-set for each of combinations of frequencies and amplitudes are written in the matrix table 106. However, the present disclosed technology is not limited thereto. At least one of the detectable frequency band or the parameter ratio may be written in the matrix table 106. In addition, in the fifth embodiment, the adjustment unit 95 uses the detectable frequency band and the parameter ratio acquired from the matrix table 106 to set the shake correction unit driving unit 71. However, the present disclosed technology is not limited thereto. The adjustment unit 95 may use at least one of the detectable frequency band or the parameter ratio acquired from the matrix table 106 to set the shake correction unit driving unit 71.

In addition, in the fifth embodiment, an arithmetic expression in which the frequency and the amplitude are independent variables and the detectable frequency band and the parameter ratio are dependent variables may be used instead of the matrix table 106. Even in a case where such an arithmetic expression is used, it is possible to set the detectable frequency band and the parameter ratio for each of combinations of the amplitudes and the frequencies of vibration applied to the binocle 10 and thus it is possible to achieve the same effect as above.

Sixth Embodiment

Figure 21:
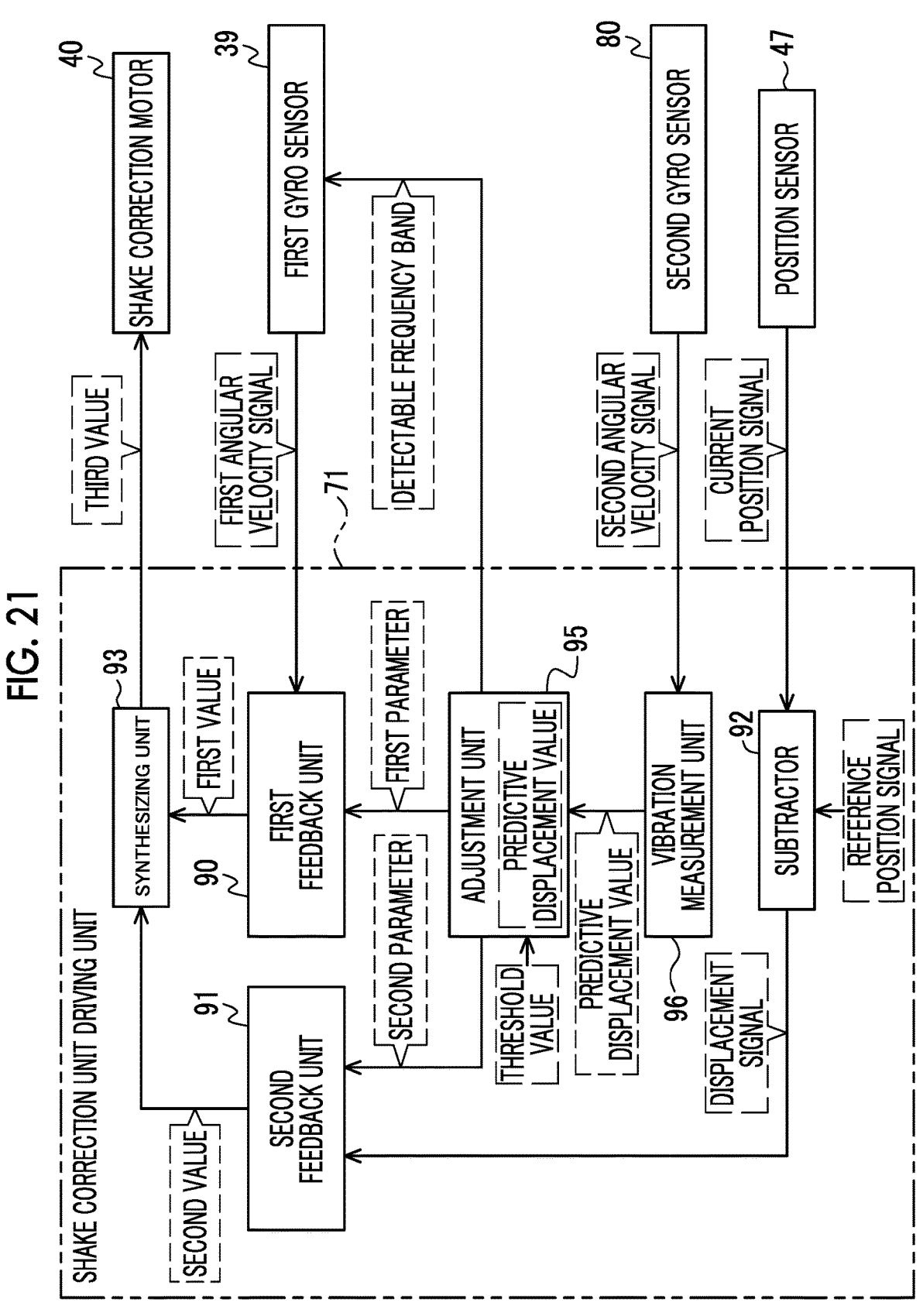
FIG. 21 is a block diagram showing an example of the main functions of a binocle according to a sixth embodiment.

For example, as shown in FIG. 21, in the sixth embodiment, the vibration measurement unit 96 calculates a moving distance, by which the housing 11 is moved because of vibration applied thereto, by integrating the second angular velocity signal and predicts displacement of the shake correction unit 30 from the reference position S based on the calculated moving distance of the housing 11.

In a case where the predictive value of the displacement of the shake correction unit 30 (hereinafter, simply referred to as "predictive displacement value") exceeds a preset range, the adjustment unit 95 performs control such that the shake correction unit is fixed at the reference position. More specifically, the adjustment unit 95 performs control such that the shake correction unit 30 is fixed at the reference position S in a case where the predictive displacement value (for example, absolute value of predictive displacement value) is larger than a predetermined threshold value (for example, limit value of displacement determined in accordance with sizes of openings 54a and 51a). Accordingly, the shake correction unit 30 is prevented from being damaged because of displacement surpassing the specification of the shake correction unit 30 in a case where excessive vibration is applied to the binocle 10, for example.

As described above, according to the sixth embodiment, the vibration measurement unit 96 predicts displacement of the shake correction unit 30 by integrating the second angular velocity signal. The adjustment unit 95 performs control such that the shake correction unit 30 is fixed at the reference position S in a case where the predictive displacement value is larger than the predetermined threshold value. Therefore, damage to the shake correction unit 30 can be prevented.

In each of the embodiments described above, a ratio has been used as the degree of difference between the first value and the second value. However, the present disclosed technology is not limited thereto. Note that other examples of the degree of difference include the absolute value of the difference between the first value and the second value or the absolute value of the ratio×the difference.

In each of the above-described embodiments, the first feedback unit 90 outputs the product of the first angular velocity signal and the first parameter A as the first value, and the second feedback unit 91 outputs the product of the displacement signal and the second parameter B as the second value. However, the present disclosed technology is not limited thereto. For example, the first value may be the absolute value of the difference between the first angular velocity signal and the first parameter A and the second value may be the absolute value of the difference between the displacement signal and the second parameter B. In this case, the adjustment unit 95 can change the degree of difference between the first value and the second value in the third value by changing the first parameter A and the second parameter B.

Figure 22:
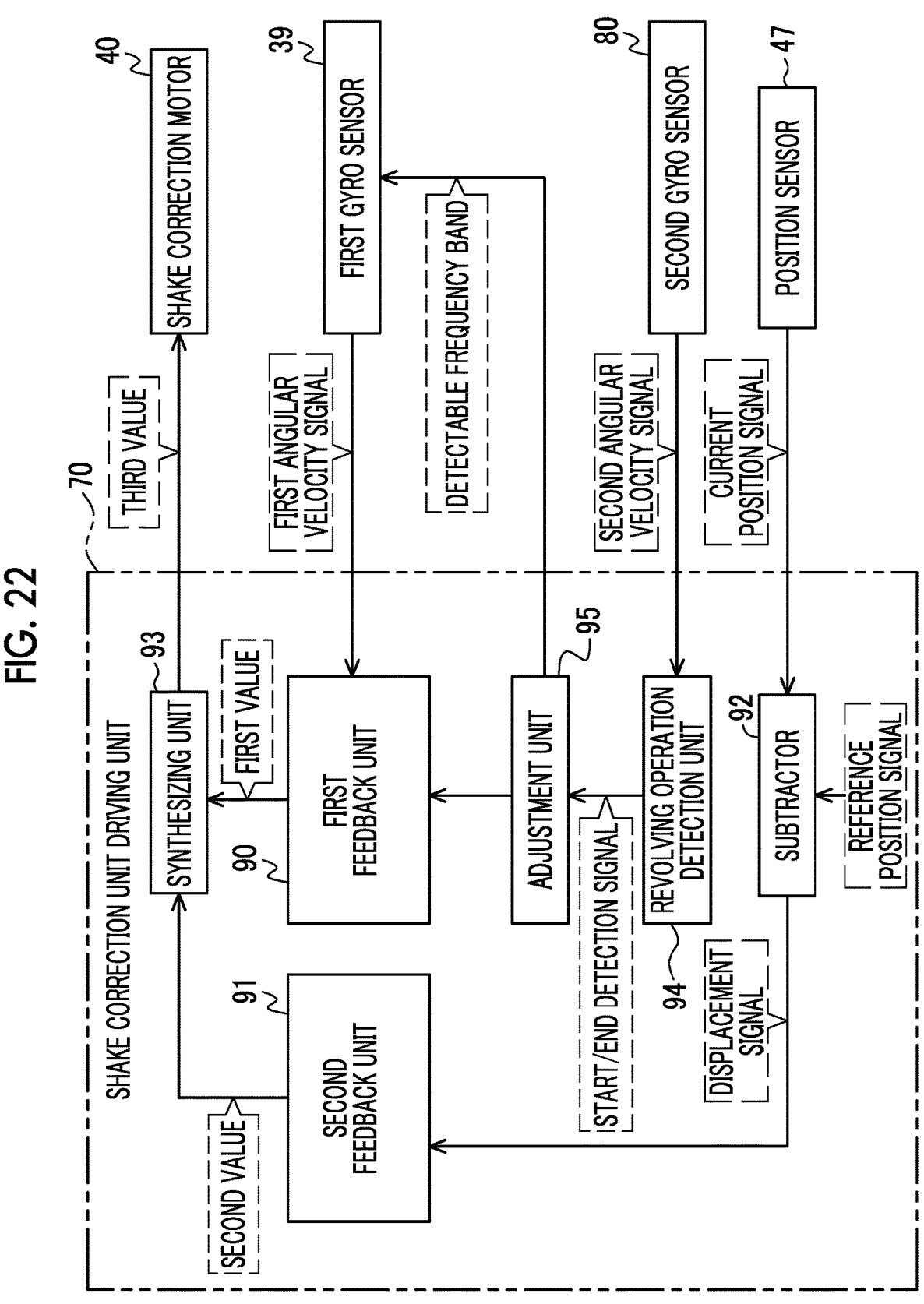
FIG. 22 is a block diagram showing an example of the main functions of a binocle in which a detectable frequency band of a first gyro sensor is changed in anti-vibration control.
Figure 23:
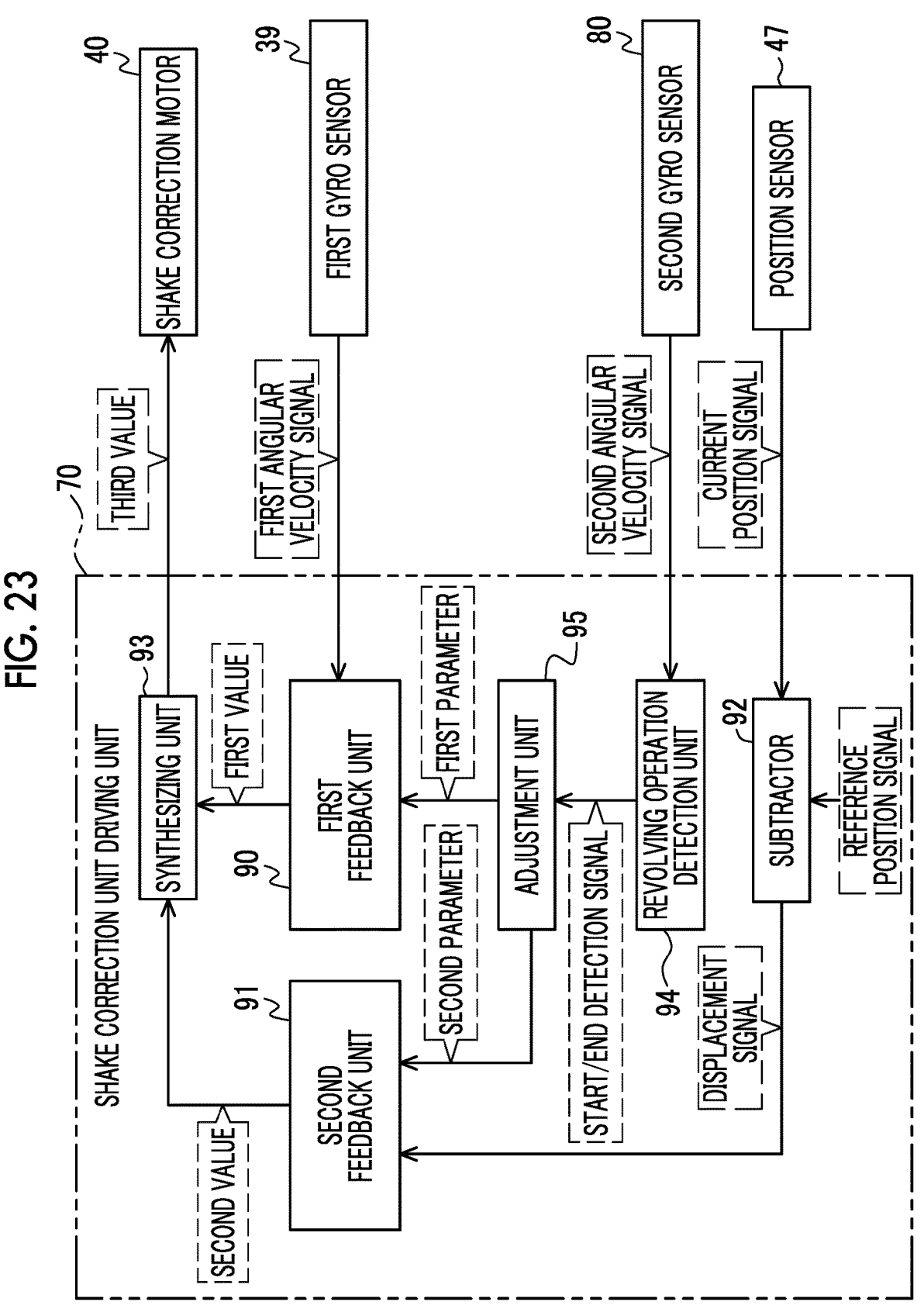
FIG. 23 is a block diagram showing an example of the main functions of a binocle in which a ratio between a first parameter and a second parameter is changed in anti-vibration control.

In addition, in each of the above-described embodiments, the adjustment unit 95 changes both of the detectable frequency band and the parameter ratio based on the second angular velocity signal. However, the present disclosed technology is not limited thereto. For example, as shown in FIG. 22, the adjustment unit 95 may change only the detectable frequency band based on the second angular velocity signal. In addition, for example, as shown in FIG. 23, the adjustment unit 95 may change only the parameter ratio based on the second angular velocity signal. In any case, it is possible to change the degree of difference between the first value and the second value by changing the detectable frequency band or the parameter ratio and thus it is possible to achieve the same effects as the above-described embodiments.

In addition, in each of the above-described embodiments, different types of gyro sensors are used as the first gyro sensor 39 and the second gyro sensor 80. However, the present disclosed technology is not limited thereto and the same types of gyro sensors may also be used. In addition, although the first gyro sensor 39 has a filter function, the second gyro sensor 80 may or may not have a filter function.

In addition, in each of the above-described embodiments, the second gyro sensor 80 has a sensitivity equivalent to the sensitivity of the first gyro sensor 39. However, the present disclosed technology is not limited thereto and the second gyro sensor 80 may have a sensitivity lower than that of the first gyro sensor 39. The reason for this will be described below. In the anti-vibration control, the shake correction unit driving unit 70 controls the shake correction unit 30 such that the first angular velocity signal output from the first gyro sensor 39 is made close to a minute value such as zero. Accordingly, it is preferable that the sensitivity of the first gyro sensor 39 is high. Meanwhile, the second gyro sensor 80 detects vibration applied to the binocle 10. That is, the second gyro sensor 80 detects vibration with a larger amplitude than the first gyro sensor 39. Accordingly, the sensitivity of the second gyro sensor 80 may be lower than the sensitivity of the first gyro sensor 39. In a case where the second gyro sensor 80 has a sensitivity lower than that of the first gyro sensor 39, the accuracy of the anti-vibration control can be improved in comparison with a case where the second gyro sensor 80 has a sensitivity higher than that of the first gyro sensor 39.

In addition, in each of the above-described embodiments, a frequency band detectable by the second gyro sensor 80 is equivalent to a frequency band detectable by the first gyro sensor 39. However, the present disclosed technology is not limited thereto. In addition, a frequency band detectable by the second gyro sensor 80 may be wider than a frequency band detectable by the first gyro sensor 39. The reason for this will be described below. The shake correction unit driving unit 70 performs control such that the first angular velocity signal output from the first gyro sensor 39 is made close to zero, for example. Accordingly, for improvement of the accuracy of the anti-vibration control, it is preferable that the first angular velocity signal is a signal that does not include a high-frequency component and a low-frequency component of a frequency band unnecessary for shake correction. The first gyro sensor 39 can output, as the first angular velocity signal used for shake correction, an angular velocity signal from which a signal causing a noise has been removed by using the filter functions to remove a high-frequency component and a low-frequency component of a frequency band unnecessary for shake correction. Meanwhile, the second angular velocity signal output from the second gyro sensor 80 is used to detect the state of use of the binocle 10 and there is no problem even in a case where the second angular velocity signal includes a high-frequency component and a low-frequency component. Therefore, it is preferable that a frequency band detectable by the second gyro sensor 80 is wider than a frequency band detectable by the first gyro sensor 39.

In addition, in each of the embodiments described above, the second gyro sensor 80 is attached to the front side of the housing 11 while being disposed below the objective barrel 27. However, the present disclosed technology is not limited thereto. The second gyro sensor 80 may be attached to, for example, a frame holding the shake correction unit 30 as long as the second gyro sensor 80 is attached to an object holding the shake correction unit 30. Accordingly, the second gyro sensor 80 can detect vibration applied to the object holding the shake correction unit 30 such as a frame holding the shake correction unit 30.

Figure 24:
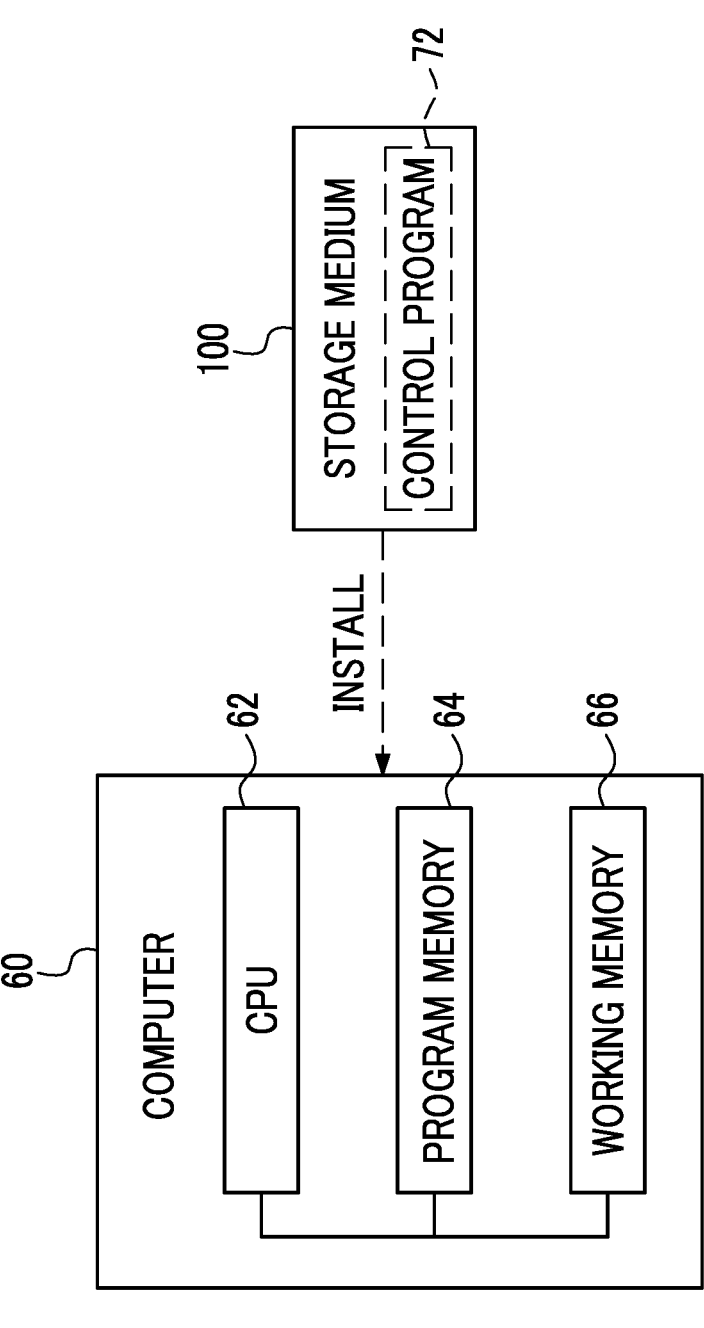
FIG. 24 is a conceptual diagram showing an example of the way in which a control program stored in a storage medium is installed in a computer of a binocle.

In addition, in the above-described embodiments, an example in which the control program 72 is stored in the program memory 64 has been described. However, the present disclosed technology is not limited thereto. For example, as shown in FIG. 24, the control program 72 may be stored in a storage medium 100. Examples of the storage medium 100 include any portable storage medium such as an SSD or a USB memory. In this case, the control program 72 stored in the storage medium 100 is installed in the computer 60 and is executed on the working memory 66 by the CPU 62.

In addition, the control program 72 may be stored in a storage unit of another computer, a server apparatus, or the like that is connected to the computer 60 via a communication network (not shown). In this case, the control program 72 may be downloaded from the storage unit of the other computer, the server apparatus, or the like to the program memory 64 and be installed in the computer 60.

Note that, it is not necessary to store the entire control program 72 in the storage unit of the other computer, the server apparatus, or the like that is connected to the computer 60 or in the program memory 64 and the control program 72 may be stored partially.

In each of the above-described embodiments, for example, as the hardware structure of the computer 60 that executes various processes for the fixation mechanism driving unit 68 and the shake correction unit driving units 70 and 71, various processors as follows can be used. The various processors include, in addition to the CPU 62 which is a general-purpose processor functioning as various processing units while executing software (for example, control program 72), a PLD such as an FPGA which is a processor of which the circuit configuration can be changed after manufacture and/or a dedicated electric circuit such as an ASIC which is a processor having a circuit configuration specially designed for performing a specific process.

One processing unit may be composed of one of these various processors or a combination of two or more processors of the same type or different types (for example, combination of plurality of FPGAs and/or combination of CPU and FPGA). In addition, a plurality of processing units may be composed of one processor.

As examples of a configuration in which a plurality of processing units are composed of one processor, firstly, there is a configuration in which one processor is composed of a combination of one or more CPUs and software and the processor functions as a plurality of processing units as represented by a computer such as a client, a server, and the like. Secondly, there is an example in which a processor that realizes, with one IC chip, the functions of the entire system including a plurality of processing units as represented by an SoC is used. As described above, various processing units are configured by using one or more of the above-described various processors as the hardware structure.

Furthermore, as the hardware structure of the various processors, more specifically, an electric circuit in which circuit elements such as semiconductor elements are combined with each other can be used.

The above-described control process is merely an example. Therefore, it is a matter of course that an unnecessary step may be deleted, a new step may be added, and the order in which processes are performed may be changed without departing from the spirit.

Regarding the present disclosed technology, the above-described various embodiments and/or various modification examples can be combined with each other as appropriate. In addition, it is a matter of course that the present disclosed technology is not limited to the above-described embodiment and various configurations can be adopted without departing from the gist. Furthermore, the present disclosed technology covers, in addition to a program, a storage medium that temporarily stores the program.

Contents described and illustrated above are for detailed description of a part according to the present disclosed technology and are merely an example of the present disclosed technology. For example, description of the above-described configurations, functions, actions, and effects is description related to an example of configurations, functions, actions, and effects of a part according to the present disclosed technology. Therefore, it is a matter of course that an unnecessary part of the contents described and illustrated above may be deleted, a new element may be added, and replacement may be made without departing from the spirit of the present disclosed technology. In addition, in order to avoid complication and facilitate the understanding of a portion according to the present disclosed technology, regarding the contents described and illustrated above, description related to common technical knowledge or the like which does not need to be described to enable implementation of the present disclosed technology has been omitted.

In the present specification, "A and/or B" has the same meaning as "at least one of A or B". That is, "A and/or B" means "A, B, or a combination of A and B". In addition, in the present specification, the same concept as in the case of "A and/or B" applies to a case where three or more matters are expressed together by "and/or".

All publications, patent applications, and technical standards described in the present specification are incorporated herein by reference to the same extent as if each publication, patent application, or technical standard was specifically and individually indicated to be incorporated by reference.

Furthermore, an appendix as follows will be disclosed in relation to the above-described embodiments.

[Appendix 1]

A anti-vibration device which includes a shake correction unit, the anti-vibration device including:

a first vibration detector that is disposed in the shake correction unit;

a second vibration detector that is disposed outside the shake correction unit; and a processor, in which the processor performs anti-vibration control based on a first output value output from the first vibration detector and a second output value output from the second vibration detector, and a detectable frequency band of the first vibration detector is set for each of combinations of amplitudes and frequencies of vibration applied to the anti-vibration device.

What is claimed is:

1. An anti-vibration device which includes a shake correction unit, the anti-vibration device comprising:

a first vibration detector that is disposed in the shake correction unit;

a second vibration detector that is disposed outside the shake correction unit; and a processor, wherein the processor performs anti-vibration control based on a first value based on a first output value output from the first vibration detector and a second value based on a second output value output from the second vibration detector, the anti-vibration control includes a first anti-vibration control correcting an image shake caused by rotation of the shake correction unit and a second anti-vibration control correcting displacement of the shake correction unit from a reference position, the first value is a value contributing to the first anti-vibration control, the second value is a value contributing to the second anti-vibration control, and the processor changes a ratio between the first value and the second value in accordance with a state of use of the anti-vibration device.

2. The anti-vibration device according to claim 1, wherein the processor sets the second value higher than the first value during a revolving operation of the anti-vibration device.

3. The anti-vibration device according to claim 1, wherein the anti-vibration device is an integrated device.

4. The anti-vibration device according to claim 1, wherein a vibration detection axis of each of the first vibration detector and the second vibration detector is parallel to a rotary shaft of the shake correction unit.

5. The anti-vibration device according to claim 4, wherein:

the shake correction unit includes a plurality of the rotary shafts, and the vibration detection axes are parallel to the rotary shafts with respect to axial directions along the vibration detection axes of the first vibration detector and the second vibration detector, respectively.

6. An anti-vibration device which includes a shake correction unit, the anti-vibration device comprising:

a first vibration detector that is disposed in the shake correction unit;

a second vibration detector that is disposed outside the shake correction unit; and a processor, wherein the processor performs anti-vibration control based on a first value based on a first output value output from the first vibration detector and a second value based on a second output value output from the second vibration detector, the anti-vibration control includes a first anti-vibration control correcting an image shake caused by rotation of the shake correction unit and a second anti-vibration control correcting displacement of the shake correction unit from a reference position, the first value is a value contributing to the first anti-vibration control, the second value is a value contributing to the second anti-vibration control, and the second vibration detector has a sensitivity lower than a sensitivity of the first vibration detector.

7. The anti-vibration device according to claim 1, wherein the second vibration detector has a sensitivity equivalent to a sensitivity of the first vibration detector.

8. An anti-vibration device which includes a shake correction unit, the anti-vibration device comprising:

a first vibration detector that is disposed in the shake correction unit;

a second vibration detector that is disposed outside the shake correction unit; and a processor, wherein the processor performs anti-vibration control based on a first value based on a first output value output from the first vibration detector and a second value based on a second output value output from the second vibration detector, the anti-vibration control includes a first anti-vibration control correcting an image shake caused by rotation of the shake correction unit and a second anti-vibration control correcting displacement of the shake correction unit from a reference position, the first value is a value contributing to the first anti-vibration control, the second value is a value contributing to the second anti-vibration control, and a frequency band detectable by the second vibration detector is wider than a frequency band detectable by the first vibration detector.

9. The anti-vibration device according to claim 1, wherein a frequency band detectable by the second vibration detector is equivalent to a frequency band detectable by the first vibration detector.

10. The anti-vibration device according to claim 1, wherein, in the anti-vibration control, the processor performs control such that the first output value is made close to a predetermined value.

11. An anti-vibration device which includes a shake correction unit, the anti-vibration device comprising:

a first vibration detector that is disposed in the shake correction unit;

a second vibration detector that is disposed outside the shake correction unit; and a processor, wherein the processor performs anti-vibration control based on a first value based on a first output value output from the first vibration detector and a second value based on a second output value output from the second vibration detector, the anti-vibration control includes a first anti-vibration control correcting an image shake caused by rotation of the shake correction unit and a second anti-vibration control correcting displacement of the shake correction unit from a reference position, the first value is a value contributing to the first anti-vibration control, the second value is a value contributing to the second anti-vibration control, the processor detects a state of use of the anti-vibration device based on the second output value, and the processor performs the anti-vibration control based on a result of the detection.

12. The anti-vibration device according to claim 11, wherein the state of use includes a state resulting from a use environment of the anti-vibration device.

13. The anti-vibration device according to claim 11, wherein the state of use is at least one of a start or an end of a revolving operation of the anti-vibration device.

14. The anti-vibration device according to claim 13, wherein the revolving operation is at least one of a panning operation or a tilting operation.

15. The anti-vibration device according to claim 13, wherein:

a detectable frequency band of the first vibration detector is changeable, the processor sets the detectable frequency band to a wide frequency band in a case in which the shake correction unit performs an anti-vibration operation, and the processor changes the detectable frequency band from the wide frequency band to a narrow frequency band in a case in which the start of the revolving operation is detected.

16. The anti-vibration device according to claim 15, wherein the processor changes the detectable frequency band from the narrow frequency band to the wide frequency band in a case in which the end of the revolving operation is detected.

17. The anti-vibration device according to claim 15, wherein:

the processor measures a frequency of vibration applied to the anti-vibration device based on the second output value, and the processor widens the detectable frequency band toward at least one of a high-frequency side or a low-frequency side in accordance with the measured frequency.

18. The anti-vibration device according to claim 1, wherein:

the processor predicts displacement of the shake correction unit from a reference position by integrating the second output value, and the processor performs control such that the shake correction unit is fixed at the reference position in a case in which a predictive value of the displacement exceeds a preset range.

19. The anti-vibration device according to claim 1, further comprising:

a housing that accommodates the shake correction unit, wherein the second vibration detector is disposed in the housing.

20. The anti-vibration device according to claim 19, wherein the anti-vibration device is a device integrated with the housing.

21. An optical device comprising:

the anti-vibration device according to claim 1; and one or more observation optical systems.

22. A binocle comprising:

the optical device according to claim 21 that includes two observation optical systems, wherein the first vibration detector is disposed at a center of a space between the two observation optical systems.

23. The binocle according to claim 22, wherein the second vibration detector is attached to an object that holds the shake correction unit.

24. The binocle according to claim 23, wherein the object is a frame that holds the shake correction unit or a housing of the binocle.

25. A control method for an anti-vibration device including a shake correction unit, a first vibration detector disposed in the shake correction unit, and a second vibration detector disposed outside the shake correction unit, the control method comprising:

performing anti-vibration control based on a first value based on a first output value output from the first vibration detector and a second value based on a second output value output from the second vibration detector; and changing a ratio between the first value and the second value in accordance with a state of use of the anti-vibration device, wherein:

the anti-vibration control includes a first anti-vibration control correcting an image shake caused by rotation of the shake correction unit and a second anti-vibration control correcting displacement of the shake correction unit from a reference position;

the first value is a value contributing to the first anti-vibration control; and the second value is a value contributing to the second anti-vibration control.

26. A non-transitory computer-readable storage medium storing a program executable by a computer, the computer being applied to an anti-vibration device including a shake correction unit, a first vibration detector disposed in the shake correction unit, and a second vibration detector disposed outside the shake correction unit, to perform processing comprising:

performing anti-vibration control based on a first value based on a first output value output from the first vibration detector and a second value based on a second output value output from the second vibration detector; and changing a ratio between the first value and the second value in accordance with a state of use of the anti-vibration device, wherein:

the anti-vibration control includes a first anti-vibration control correcting an image shake caused by rotation of the shake correction unit and a second anti-vibration control correcting displacement of the shake correction unit from a reference position;

the first value is a value contributing to the first anti-vibration control; and the second value is a value contributing to the second anti-vibration control.

* * * * *